US012684386B2

(12) United States Patent
Xu et al.

(10) Patent No.: US 12,684,386 B2
(45) Date of Patent: Jul. 14, 2026

(54) CHANNEL STATE INFORMATION REFERENCE SIGNAL TRIGGERING WHEN SECONDARY CELL DORMANCY IS CONFIGURED

(71) Applicant: QUALCOMM INCORPORATED, San Diego, CA (US)

(72) Inventors: Huilin Xu, Temecula, CA (US); Peng Cheng, Beijing (CN); Yu Zhang, San Diego, CA (US); Changhwan Park, San Diego, CA (US); Chenxi Hao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 18/042,538

(22) PCT Filed: Sep. 7, 2020

(86) PCT No.: PCT/CN2020/113747
§ 371 (c)(1),
(2) Date: Feb. 22, 2023

(87) PCT Pub. No.: WO2022/047777
PCT Pub. Date: Mar. 10, 2022

(65) Prior Publication Data
US 2023/0345281 A1     Oct. 26, 2023

(51) Int. Cl.
*H04W 24/10*          (2009.01)
*H04B 7/06*           (2006.01)
(Continued)

(52) U.S. Cl.
CPC .......... *H04W 24/10* (2013.01); *H04L 5/0048* (2013.01); *H04W 36/0088* (2013.01); *H04B 7/0626* (2013.01)

(58) Field of Classification Search
CPC . H04W 24/10; H04W 36/0088; H04W 24/08; H04L 5/0048; H04L 5/001; H04L 5/0053; H04B 7/0626
See application file for complete search history.

(56) References Cited

U.S. PATENT DOCUMENTS

| | | | |
|---|---|---|---|
| 2015/0208269 A1 | 7/2015 | Damnjanovic et al. | |
| 2015/0215929 A1* | 7/2015 | Damnjanovic ....... | H04W 72/21 |
| | | | 370/241 |

(Continued)

FOREIGN PATENT DOCUMENTS

| | | |
|---|---|---|
| CN | 109963296 A | 7/2019 |
| EP | 3706458 A1 | 9/2020 |
| WO | WO-2019099533 A1 | 5/2019 |

OTHER PUBLICATIONS

CATT: "Draft Reply LS on Dormant BWP Configuration and Related Operation", 3GPP TSG-RAN WG1 Meeting #100bis-e, R1-2002057, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020 (Apr. 11, 2020), XP051875414, 6 Pages, pp. 3-5.

(Continued)

*Primary Examiner* — Thomas R Cairns
*Assistant Examiner* — Raenita Ann Fenner
(74) *Attorney, Agent, or Firm* — Holland & Hart LLP

(57) ABSTRACT

Methods, systems, and devices for wireless communications are described. A user equipment (UE) may identify a cell measurement supported by the UE, the cell measurement
(Continued)

associated with the UE supporting channel state information measurements of a dormant secondary cell in a cell group. The UE may receive a downlink control information triggering channel state information reference signal measurements for a set of cells in the cell group, the set of cells comprising the dormant secondary cell. The UE may perform, based at least in part on the downlink control information, the channel state information reference signal measurements on one or more cells in the set of cells according to the cell measurement supported by the UE to identify channel state information for each of the one or more cells.

16 Claims, 17 Drawing Sheets

(51) Int. Cl.
H04L 5/00 (2006.01)
H04W 36/00 (2009.01)

(56) References Cited

U.S. PATENT DOCUMENTS

| | | | |
|---|---|---|---|
| 2018/0302894 A1 | 10/2018 | Davydov et al. | |
| 2019/0021052 A1 | 1/2019 | Kadiri et al. | |
| 2019/0207662 A1 | 7/2019 | Zhou et al. | |
| 2019/0296805 A1* | 9/2019 | Son | H04W 76/27 |
| 2020/0028613 A1 | 1/2020 | Nam et al. | |
| 2020/0145164 A1* | 5/2020 | Cheng | H04W 52/265 |
| 2020/0229081 A1 | 7/2020 | Ang et al. | |

OTHER PUBLICATIONS

Supplementary European Search Report—EP20952021—Search Authority—The Hague—Apr. 22, 2024 (206785EP).
CATT: "Summary of PDCCH-Based Power Saving Signal/ Channel", 3GPP TSG RAN WG1 Meeting #100e, R1-2001137, Feb. 21, 2020 (Feb. 21, 2020), 16 Pages, the whole document.
International Search Report and Written Opinion—PCT/CN2020/ 113747—ISA/EPO—Jun. 3, 2021 (206785WO1).

* cited by examiner

510

515

520

505

500

910

915

920

905

900

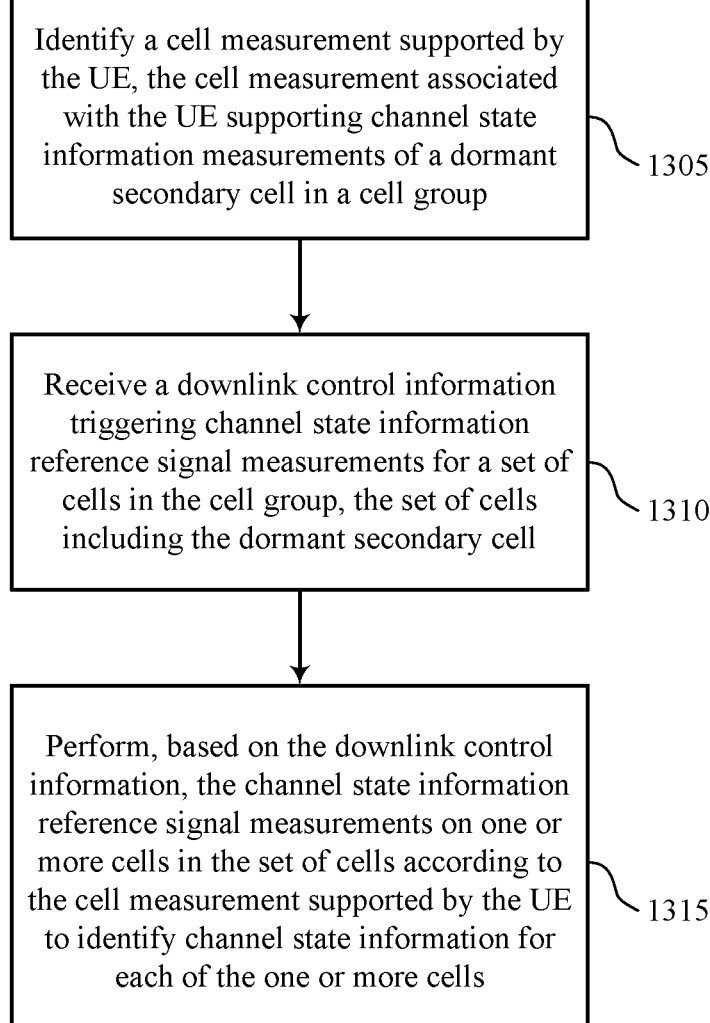

Identify a cell measurement supported by the UE, the cell measurement associated with the UE supporting channel state information measurements of a dormant secondary cell in a cell group

1305

Receive a downlink control information triggering channel state information reference signal measurements for a set of cells in the cell group, the set of cells including the dormant secondary cell

1310

Perform, based on the downlink control information, the channel state information reference signal measurements on one or more cells in the set of cells according to the cell measurement supported by the UE to identify channel state information for each of the one or more cells

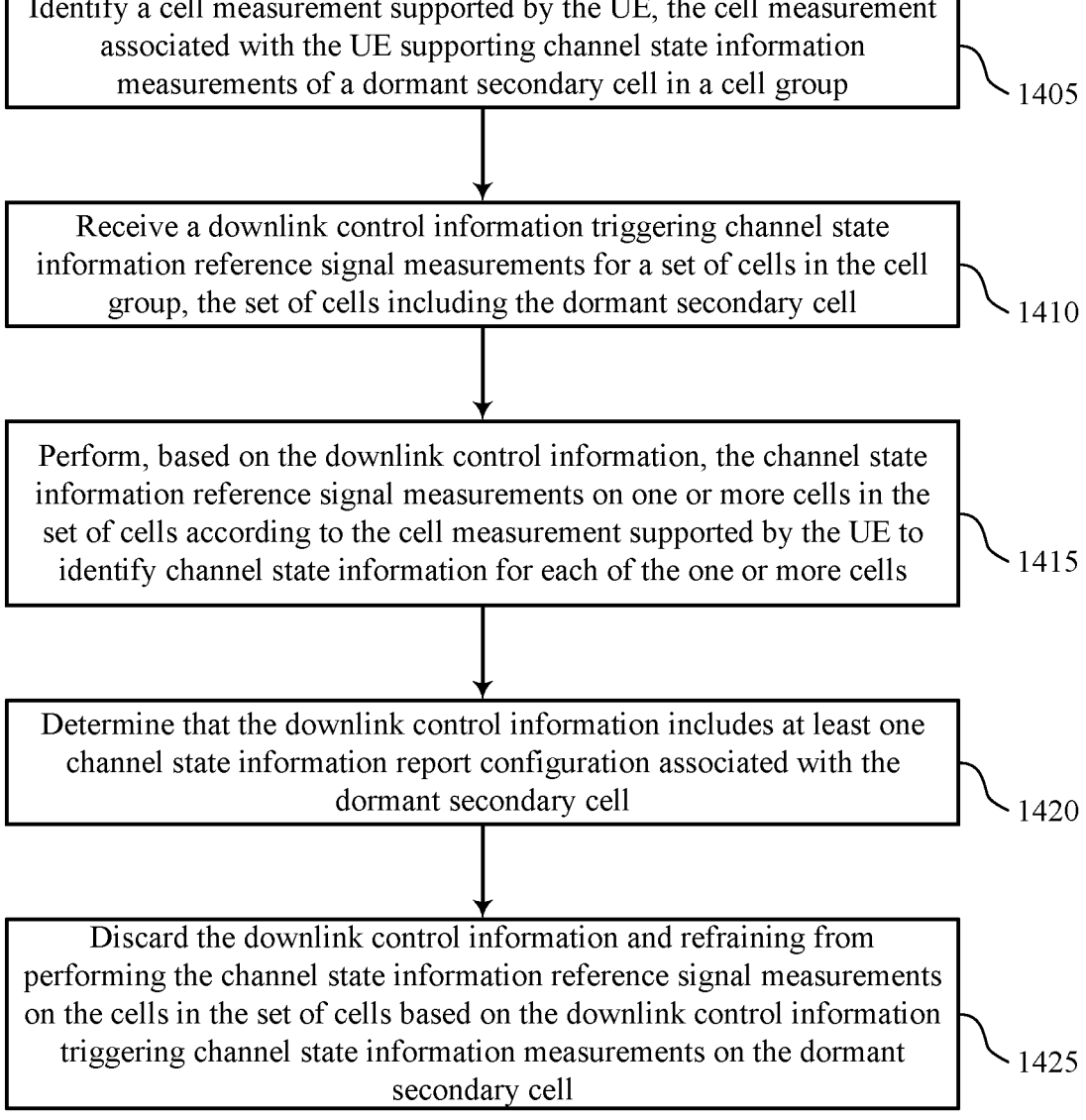

Identify a cell measurement supported by the UE, the cell measurement associated with the UE supporting channel state information measurements of a dormant secondary cell in a cell group

1405

Receive a downlink control information triggering channel state information reference signal measurements for a set of cells in the cell group, the set of cells including the dormant secondary cell

1410

Perform, based on the downlink control information, the channel state information reference signal measurements on one or more cells in the set of cells according to the cell measurement supported by the UE to identify channel state information for each of the one or more cells

1415

Determine that the downlink control information includes at least one channel state information report configuration associated with the dormant secondary cell

1420

Discard the downlink control information and refraining from performing the channel state information reference signal measurements on the cells in the set of cells based on the downlink control information triggering channel state information measurements on the dormant secondary cell

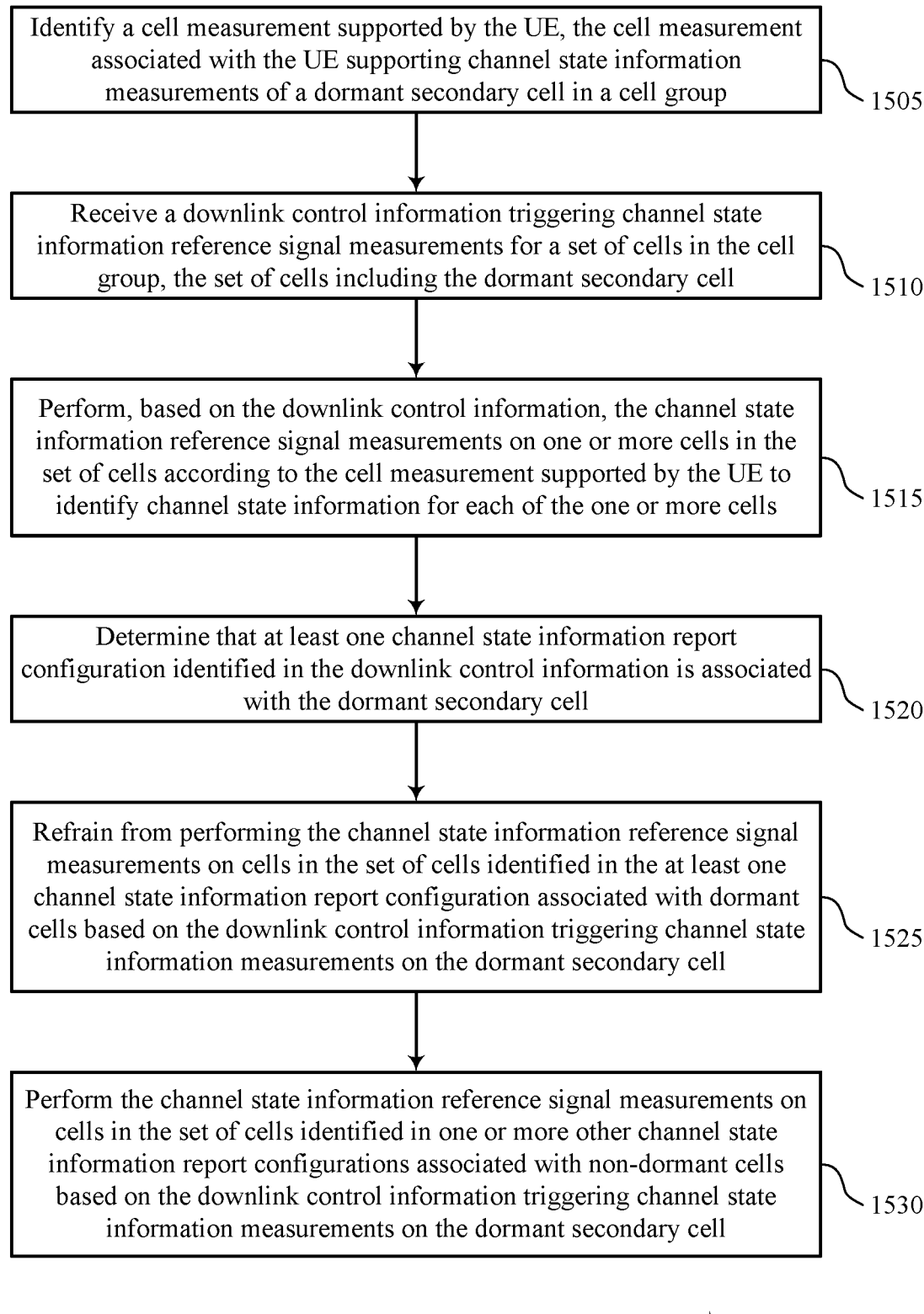

Identify a cell measurement supported by the UE, the cell measurement associated with the UE supporting channel state information measurements of a dormant secondary cell in a cell group

1505

Receive a downlink control information triggering channel state information reference signal measurements for a set of cells in the cell group, the set of cells including the dormant secondary cell

1510

Perform, based on the downlink control information, the channel state information reference signal measurements on one or more cells in the set of cells according to the cell measurement supported by the UE to identify channel state information for each of the one or more cells

1515

Determine that at least one channel state information report configuration identified in the downlink control information is associated with the dormant secondary cell

1520

Refrain from performing the channel state information reference signal measurements on cells in the set of cells identified in the at least one channel state information report configuration associated with dormant cells based on the downlink control information triggering channel state information measurements on the dormant secondary cell

1525

Perform the channel state information reference signal measurements on cells in the set of cells identified in one or more other channel state information report configurations associated with non-dormant cells based on the downlink control information triggering channel state information measurements on the dormant secondary cell

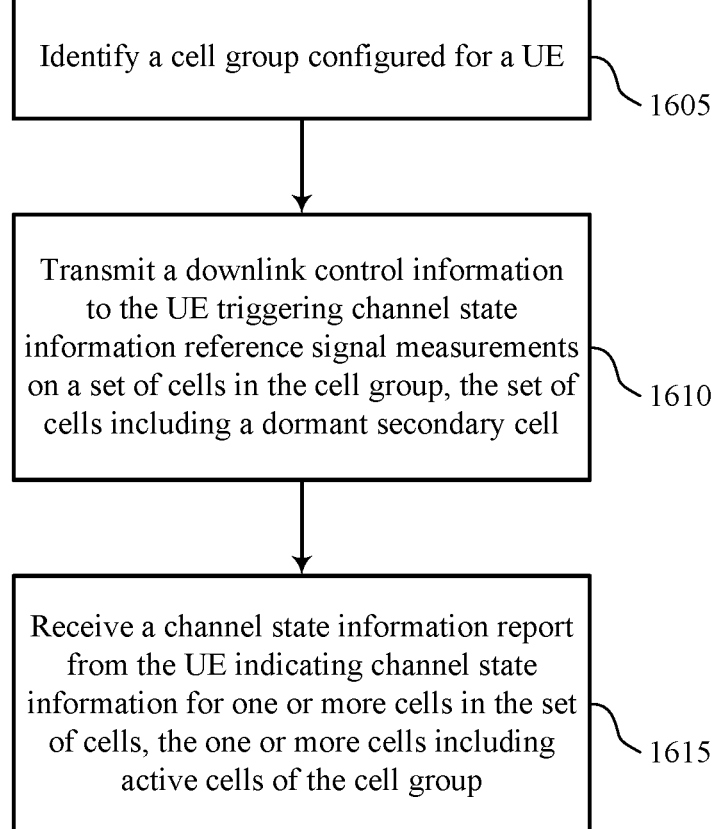

Identify a cell group configured for a UE

1605

Transmit a downlink control information to the UE triggering channel state information reference signal measurements on a set of cells in the cell group, the set of cells including a dormant secondary cell

1610

Receive a channel state information report from the UE indicating channel state information for one or more cells in the set of cells, the one or more cells including active cells of the cell group

CHANNEL STATE INFORMATION REFERENCE SIGNAL TRIGGERING WHEN SECONDARY CELL DORMANCY IS CONFIGURED

CROSS REFERENCE

The present Application is a 371 national stage filing of International PCT Application No. PCT/CN2020/113747 by Xu et al. entitled "CHANNEL STATE INFORMATION REFERENCE SIGNAL TRIGGERING WHEN SECONDARY CELL DORMANCY IS CONFIGURED," filed Sep. 7, 2020, which is assigned to the assignee hereof, and which is expressly incorporated by reference in its entirety herein.

FIELD OF TECHNOLOGY

The following relates to wireless communications, including channel state information reference signal triggering when secondary cell dormancy is configured.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support channel state information (CSI) reference signal triggering when secondary cell (SCell) dormancy is configured. Generally, the described techniques provide for a user equipment (UE) to identify or otherwise determine its cell measurement support for performing reference signal measurement and reporting in the presence of dormant cells within a cell group. The cell measurement and reporting may include the UE being unable to perform reference signal measurement and reporting for dormant cells. Accordingly, the UE may receive a downlink control information (DCI) triggering reference signal measurements (e.g., CSI reference signal (CSI-RS) measurements) for carrier(s) within a cell group and perform the measurement(s) and reporting based on its supported cell measurement. For example, the UE may discard a DCI or a report configuration within a DCI, based on a triggered cell being within a dormant mode.

A method of wireless communication at a UE is described. The method may include identifying a cell measurement supported by the UE, the cell measurement associated with the UE supporting CSI measurements of a dormant SCell in a cell group, receiving a DCI triggering CSI-RS measurements for a set of cells in the cell group, the set of cells including the dormant SCell, and performing, based on the DCI, the CSI-RS measurements on one or more cells in the set of cells according to the cell measurement supported by the UE to identify CSI for each of the one or more cells.

An apparatus for wireless communication at a UE is described. The apparatus may include a processor, memory coupled with the processor, and instructions stored in the memory. The instructions may be executable by the processor to cause the apparatus to identify a cell measurement supported by the UE, the cell measurement associated with the UE supporting CSI measurements of a dormant SCell in a cell group, receive a DCI triggering CSI-RS measurements for a set of cells in the cell group, the set of cells including the dormant SCell, and perform, based on the DCI, the CSI-RS measurements on one or more cells in the set of cells according to the cell measurement supported by the UE to identify CSI for each of the one or more cells.

Another apparatus for wireless communication at a UE is described. The apparatus may include means for identifying a cell measurement supported by the UE, the cell measurement associated with the UE supporting CSI measurements of a dormant SCell in a cell group, receiving a DCI triggering CSI-RS measurements for a set of cells in the cell group, the set of cells including the dormant SCell, and performing, based on the DCI, the CSI-RS measurements on one or more cells in the set of cells according to the cell measurement supported by the UE to identify CSI for each of the one or more cells.

A non-transitory computer-readable medium storing code for wireless communication at a UE is described. The code may include instructions executable by a processor to identify a cell measurement supported by the UE, the cell measurement associated with the UE supporting CSI measurements of a dormant SCell in a cell group, receive a DCI triggering CSI-RS measurements for a set of cells in the cell group, the set of cells including the dormant SCell, and perform, based on the DCI, the CSI-RS measurements on one or more cells in the set of cells according to the cell measurement supported by the UE to identify CSI for each of the one or more cells.

In some examples of the method, apparatuses, and non-transitory computer-readable medium described herein, the performing according to the cell measurement supported by the UE may include operations, features, means, or instructions for determining that the DCI includes at least one CSI report configuration associated with the dormant SCell, and discarding the DCI and refraining from performing the CSI-RS measurements on the cells in the set of cells based on the DCI triggering CSI measurements on the dormant SCell.

In some examples of the method, apparatuses, and non-transitory computer-readable medium described herein, the performing according to the cell measurement supported by the UE may include operations, features, means, or instructions for determining that a number of active cells in the cell group may be less than a threshold, and discarding the DCI and refraining from performing the CSI-RS measurements based on the number of active cells being less than the threshold and the DCI triggering CSI-RS measurements on the dormant SCell.

In some examples of the method, apparatuses, and non-transitory computer-readable medium described herein, the performing according to the cell measurement supported by the UE may include operations, features, means, or instructions for determining that a number of cells in the cell group may be less than a threshold, and discarding the DCI and refraining from performing the CSI-RS measurements based on the number of cells being less than the threshold and the DCI triggering CSI-RS measurements on the dormant SCell.

In some examples of the method, apparatuses, and non-transitory computer-readable medium described herein, the performing according to the cell measurement supported by the UE may include operations, features, means, or instructions for determining that at least one CSI report configuration identified in the DCI may be associated with the dormant SCell, refraining from performing the CSI-RS measurements on cells in the set of cells identified in the at least one CSI report configuration associated with dormant cells based on the DCI triggering CSI measurements on the dormant SCell, and performing the CSI-RS measurements on cells in the set of cells identified in one or more other CSI report configurations associated with non-dormant cells based on the DCI triggering CSI measurements on the dormant SCell.

In some examples of the method, apparatuses, and non-transitory computer-readable medium described herein, the performing according to the cell measurement supported by the UE may include operations, features, means, or instructions for determining that a number of active cells in the cell group satisfies a threshold, and performing the CSI-RS measurements on cells in the set of cells identified in the one or more other CSI report configurations associated with non-dormant cells based on the number of active cells satisfying the threshold and the DCI triggering CSI-RS measurements on the dormant SCell.

In some examples of the method, apparatuses, and non-transitory computer-readable medium described herein, the performing according to the cell measurement supported by the UE may include operations, features, means, or instructions for determining that a number of cells in the cell group satisfies a threshold, and performing the CSI-RS measurements identified on cells in the set of cells identified in the one or more other CSI report configurations associated with non-dormant cells based on the number of cells satisfying the threshold and the DCI triggering CSI-RS measurements on the dormant SCell.

In some examples of the method, apparatuses, and non-transitory computer-readable medium described herein, the performing according to the cell measurement supported by the UE may include operations, features, means, or instructions for identifying at least one CSI report configuration identified in the DCI may be associated with non-dormant SCells in the cell group, and performing the CSI-RS measurements on the cells associated with at least one CSI report configuration associated with non-dormant cells based on the at least one CSI report configuration being associated with the non-dormant SCells and the DCI triggering CSI measurements on the dormant SCell.

In some examples of the method, apparatuses, and non-transitory computer-readable medium described herein, the DCI includes a downlink grant triggering the CSI-RS measurements or an uplink grant triggering the CSI-RS measurements.

Some examples of the method, apparatuses, and non-transitory computer-readable medium described herein may further include operations, features, means, or instructions for transmitting a CSI report indicating the CSI for the one or more cells in the set of cells, where the CSI report indicates the CSI for the active cells in the cell group.

A method of wireless communication at a primary cell is described. The method may include identifying a cell group configured for a UE, transmitting a DCI to the UE triggering CSI-RS measurements on a set of cells in the cell group, the set of cells including a dormant SCell, and receiving a CSI report from the UE indicating CSI for one or more cells in the set of cells, the one or more cells including active cells of the cell group.

An apparatus for wireless communication at a primary cell is described. The apparatus may include a processor, memory coupled with the processor, and instructions stored in the memory. The instructions may be executable by the processor to cause the apparatus to identify a cell group configured for a UE, transmit a DCI to the UE triggering CSI-RS measurements on a set of cells in the cell group, the set of cells including a dormant SCell, and receive a CSI report from the UE indicating CSI for one or more cells in the set of cells, the one or more cells including active cells of the cell group.

Another apparatus for wireless communication at a primary cell is described. The apparatus may include means for identifying a cell group configured for a UE, transmitting a DCI to the UE triggering CSI-RS measurements on a set of cells in the cell group, the set of cells including a dormant SCell, and receiving a CSI report from the UE indicating CSI for one or more cells in the set of cells, the one or more cells including active cells of the cell group.

A non-transitory computer-readable medium storing code for wireless communication at a primary cell is described. The code may include instructions executable by a processor to identify a cell group configured for a UE, transmit a DCI to the UE triggering CSI-RS measurements on a set of cells in the cell group, the set of cells including a dormant SCell, and receive a CSI report from the UE indicating CSI for one or more cells in the set of cells, the one or more cells including active cells of the cell group.

In some examples of the method, apparatuses, and non-transitory computer-readable medium described herein, receiving the CSI report may include operations, features, means, or instructions for receiving the CSI report indicating CSI for non-dormant cells in the set of cells that may be associated with a CSI report configuration.

BRIEF DESCRIPTION OF THE DRAWINGS

FIGS. 13 through 16 show flowcharts illustrating methods that support CSI-RS triggering when SCell dormancy is configured in accordance with aspects of the present disclosure.

DETAILED DESCRIPTION

Some wireless communications systems may use carrier aggregation (CA) techniques, or similar techniques, where multiple cells (e.g., a cell group) are configured for a user equipment (UE). The UE may be configured with a primary cell (PCell) and one or more secondary cell(s) (SCell) (s), with each cell performing wireless communications with the UE on a corresponding carrier. CA techniques may support cross-carrier scheduling where a PCell (for example) triggers reference signal measurement and reporting for carrier (s) of itself and/or other cell(s) within the cell group. The reference signal measurement may include the UE measuring channel state information reference signal (CSI-RS) and/or CSI interference management (CSI-IM) resources on carrier(s) corresponding to the triggered cell(s). Generally, the UE is not expected to perform such reference signal measurements and reporting for cell(s) within the cell group that are dormant. This may create the situation where the triggering downlink control information (DCI) includes a report configuration triggering reference signal measurement and reporting on a dormant cell, which is not supported by the UE.

Aspects of the disclosure are initially described in the context of wireless communications systems. Generally, the described techniques provide for a UE to identify or otherwise determine its cell measurement support for performing reference signal measurement and reporting for dormant cells within a cell group. The cell measurement and reporting may include the UE being unable to perform reference signal measurement and reporting for dormant cells. Accordingly, the UE may receive a DCI triggering reference signal measurements (e.g., CSI-RS/CSI-IM measurements) for carrier(s) within a cell group and perform the measurement(s) and reporting based on its supported cell measurement. For example, the UE may discard the DCI or a report configuration within the DCI, based on a triggered cell (e.g., a cell included in the measurement request) being in a dormant mode.

Aspects of the disclosure are further illustrated by and described with reference to apparatus diagrams, system diagrams, and flowcharts that relate to CSI-RS triggering when SCell dormancy is configured.

Figure 1:
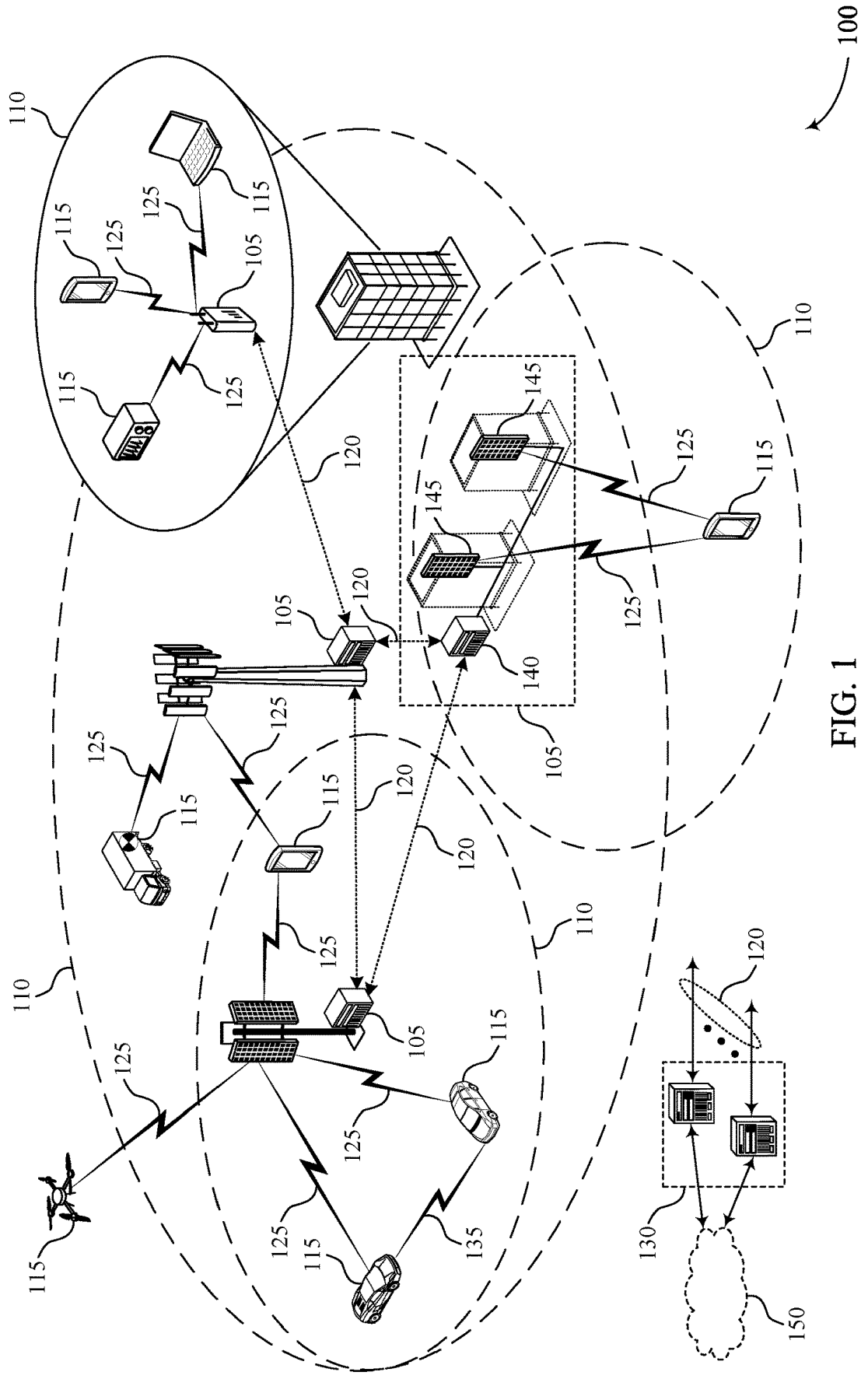
FIG. 1 illustrates an example of a system for wireless communications that supports channel state information (CSI-RS) reference signal (RS) triggering when secondary cell (SCell) dormancy is configured in accordance with aspects of the present disclosure.

FIG. 1 illustrates an example of a wireless communications system 100 that supports CSI-RS triggering when SCell dormancy is configured in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same code-word) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a trans-mitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjust-ments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming opera-tions for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Trans-missions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with trans-missions along a single beam direction may be determined based on a signal that was transmitted in one or more beam directions. For example, a UE 115 may receive one or more of the signals transmitted by the base station 105 in different directions and may report to the base station 105 an indi-cation of the signal that the UE 115 received with a highest signal quality or an otherwise acceptable signal quality.

In some examples, transmissions by a device (e.g., by a base station 105 or a UE 115) may be performed using multiple beam directions, and the device may use a combi-nation of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or code-book-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent trans-mission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to differ-ent receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configu-ration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may identify a cell measurement supported by the UE 115, such as CSI measurement of a dormant SCell in a cell group. The UE 115 may receive a DCI triggering CSI-RS measurements for a set of cells in the cell group, the set of cells including the dormant SCell. The UE 115 may perform, based at least in part on the DCI, the CSI-RS measurements on one or more cells in the set of cells according to the cell measurement supported by the UE 115 to identify CSI for each of the one or more cells.

A base station 105 (e.g., a base station 105 configured as, or otherwise associated with, a PCell) may identify a cell group configured for a UE 115. The base station 105 may transmit a DCI to the UE 115 triggering CSI-RS measurements on a set of cells in the cell group, the set of cells comprising a dormant SCell. The base station 105 may receive a CSI report from the UE 115 indicating CSI for one or more cells in the set of cells, the one or more cells comprising active (e.g., non-dormant) cells of the cell group.

Figure 2A:
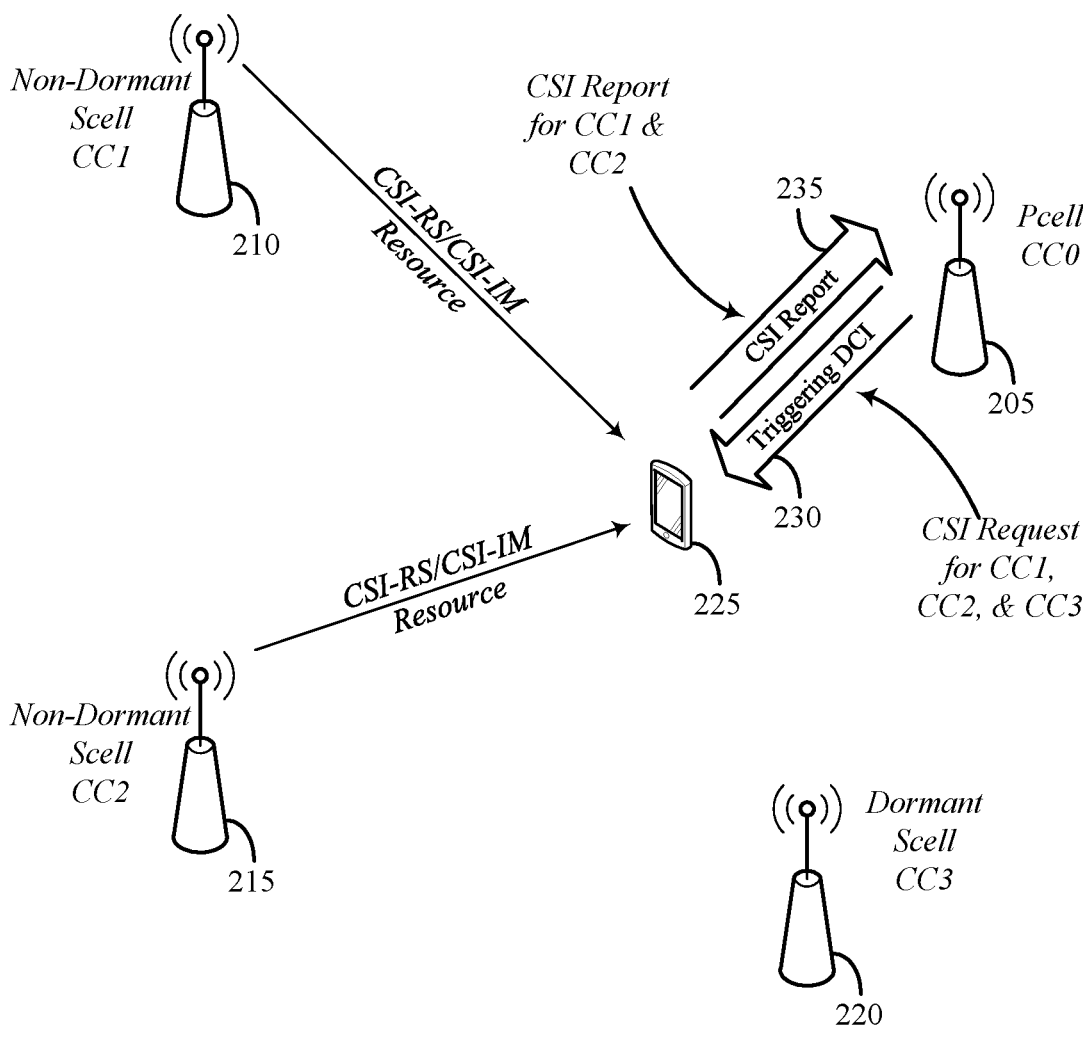
FIGS. 2A and 2B illustrate aspects of an example wireless communication system that supports CSI-RS triggering when SCell dormancy is configured in accordance with aspects of the present disclosure.
Figure 2B:
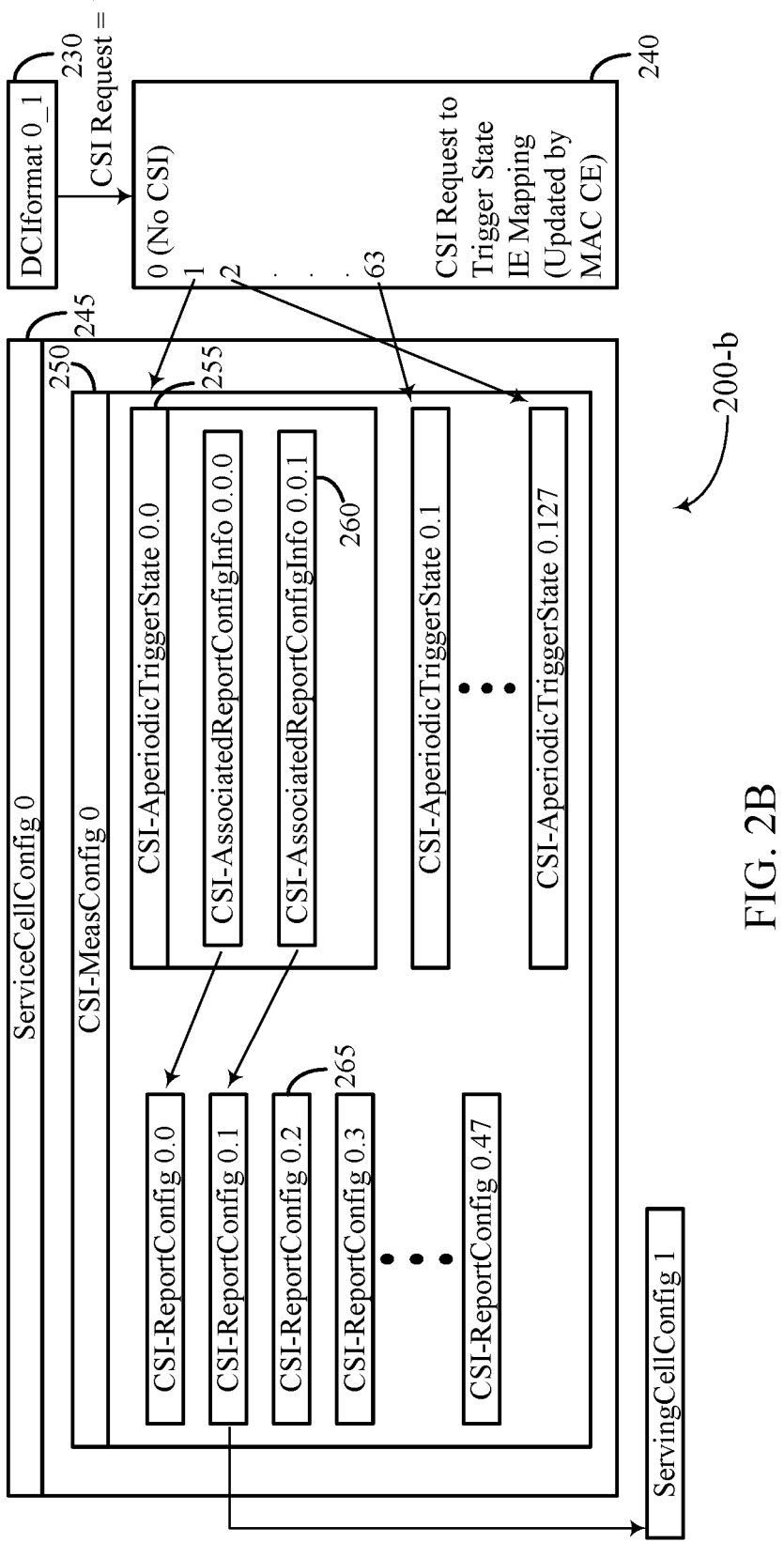

FIGS. 2A and 2B illustrate aspects of an example wireless communications system 200 that supports CSI-RS triggering when SCell dormancy is configured in accordance with aspects of the present disclosure. In some examples, wireless communications system 200 may implement aspects of wireless communications system 100. Wireless communications system 200 may include cell 205, cell 210, cell 215, cell 220, and UE 225, which may be examples of corresponding devices described herein. In some aspects, cell 205, cell 210, cell 215, and cell 220 may define or otherwise be associated with a cell group configured for UE 225. Cell 205 may be the PCell of the cell group and cell 210, cell 215, and cell 220 may be SCells of the cell group. Cell 205, cell 210 and cell 215 may be in a non-dormant mode while cell 220 may be in a dormant mode. FIG. 2A generally illustrates the example wireless communication system 200-*a* and FIG. 2B generally illustrates an example of CSI report a triggering DCI that may be implemented in wireless communication system.

Referring to FIG. 2A and as discussed above, UE 225 may be configured with a cell group to support CA operations, or any operations where UE 225 communicates with multiple cells on corresponding carriers. CA operations may include UE 225 performing wireless communications with one or more cells within the cell group on a corresponding carrier. For example, UE 225 may perform wireless communications with cell 205 on CC0, with cell 210 on CC1, with cell 215 on CC2, and/or with cell 220 on CC3 (e.g., when cell 220 is in an active state and non-dormant mode). Cell 205 may be configured as the PCell within the cell group, which may schedule communications with UE 225 and/or between UE 225 and/or SCell(s) in the cell group. Cell 210, cell 215, and/or cell 220 may be configured as SCells within the cell group. Cell 210, cell 215, and/or cell 220 may schedule communications with UE 225 and/or between UE 225 and/or other SCells and/or the PCell in the cell group.

To support such wireless communications, UE 225 may implement various channel performance measurement and reporting techniques. For example, UE 225 may measure various reference signals and/or other transmissions from the cell(s) within the cell group and report this information to cell 205 (e.g., the PCell) and/or other cell(s) within the cell group. For example, UE 225 may determine reference signal received power (RSRP), reference signal strength indicator (RSSI), CSI, channel quality information (CQI), throughput rates, interference levels, and the like, for each carrier associated with a cell within the cell group. Examples of such reference signals measured by UE 225 include, but are not limited to, CSI-RS, CSI-IM, synchronization signals, broadcast signals, tracking reference signals, beam management reference signals, and the like. UE 225 may transmit a measurement report carrying or otherwise conveying an indication of the measured channel performance measurement results to cell 205, which may utilize this information for link optimization and mobility, or scheduling decisions. In some aspects, cell 205 may trigger reference signals on other cells within the cell group for UE 225 to measure and report for (e.g., cross-carrier triggering of aperiodic CSI (A-CSI) using a DCI conveyed on a PDCCH in the CA scenario).

In some aspects, the network may configure one or more active cells in the cell group (e.g., SCell(s) in the CA group) as dormant cells. A dormant cell may be associated with low power consumption status in which UE 225 supports a lower activity operation, such as no PDCCH and/or PDSCH reception, no A-CSI-RS reception, no PUCCH and/or PUSCH transmissions, and the like, with the dormant cell(s). Accordingly, when a cell within the cell group is in a dormant mode, UE 225 may not be expected to perform reference signal measurements and reporting (e.g., A-CSI measurements and reporting) for the carrier of that cell.

Referring to FIG. 2B, generally activation of the reference signal resources for measurement by UE 225 may be based on a triggering DCI, such as triggering DCI 230. For example, cell 205 may transmit or otherwise convey triggering DCI 230 to UE 225. In some aspects, triggering DCI 230 may trigger CSI-RS measurements on a set of cells in the cell group (e.g., some or all of the cells in the cell group). For example, triggering DCI 230 may be CRC scrambled by a C-RNTI and may use various formats (e.g., DCI format 0_1, DCI format 1_1, or other formats, with DCI format 0_1 being shown by way of example only). The triggering DCI 230 may include a CSI request-to-trigger state information element (IE) mapping 245, which may be updated by MAC CE. For example, triggering DCI 230 may include a serving cell configuration IE 240 (e.g., ServingCellConfig0) having a corresponding CSI measurement configuration IE 250 (e.g., CSI-MeasConfig0).

In some aspects, each CSI measurement configuration IE 250 may have a corresponding CSI aperiodic trigger state 255 (e.g., CSI-AperiodicTriggerState0.0 or CSI-Aperiodic-TriggerState0.1), with up to 127 CSI aperiodic triggering states 225 being indicated. Each CSI aperiodic trigger state 255 may have one or more corresponding CSI associated report configurations 260 (e.g., CSI-AssociatedReportCon-figinfo0.0.0 and CSI-AssociatedReportConfiginfo0.0.1 for CSI-AperiodicTriggerState0.0, CSI-AssociatedReportCon-figinfo0.1.0 and CSI-AssociatedReportConfiginfo0.1.1 for CSI-AperiodicTriggerState0.1, and so forth). Each CSI associated report configuration 260 may be associated with one of 48 CSI report configurations 265 (e.g., CSI-Report-Config0.0, CSI-ReportConfig0.1, . . . , CSI-ReportCon-fig0.47). Accordingly, a serving cell can be configured with up to 48 CSI reporting configurations 265 and up to 128 aperiodic CSI trigger states 255. Each aperiodic CSI trigger state 255 may be linked with up to 16 CSI reporting configurations 265.

Referring again to FIG. 2B and as discussed above, triggering DCI 230 may have a corresponding format, such as a DCI format 0_1, DCI format 1_1, or other format, used to trigger an aperiodic CSI measurement reporting. For example, triggering DCI 230 may include a CSI request field 240 selecting or otherwise choosing one aperiodic CSI trigger state 255. The CSI request field 240 may span six bits (e.g., $2^6$=64 codepoints), with codepoint 0 corresponding to no aperiodic CSI. The mapping between the code points and the aperiodic CSI trigger state 255 may be configured using a MAC CE from cell 205, for example.

For cross-carrier aperiodic CSI reporting, triggering DCI 230 may indicate the CSI request as well as a CSI-RS/CSI-IM resource (e.g., the time/frequency/spatial/code resource used for transmitting the reference signal to be measured by UE 225) and the PUSCH resource that the CSI report is to be received on. In some aspects, the CSI report may be received for different CCs. Accordingly, the CSI request may be conveyed in triggering DCI 230 transmitted on a scheduling CC. The triggering DCI 230 may include a "carrier indicator" field indicating which uplink carrier to transmit PUSCH (e.g., the CSI report) and a "carrier" field in each CSI report configuration indicating which downlink carrier that the corresponding CSI report is targeting on (e.g., indicating which downlink carrier, such as CC0, CC1, CC2, and/or CC3, that UE 225 is to measure and report for). Accordingly, processing of the CSI resources on multiple downlink carriers may be triggered by the CSI request in the same DCI. That is, in some examples triggering DCI 230 may include a separate CSI request for each triggered carrier.

However, in some situations one or more cells within the cell group may be in a dormant mode. In the non-limiting example illustrated in FIG. 2A, this may include cell 220 being in a dormant mode. As UE 225, however, may not support CSI measurement reporting for cell(s) in a dormant mode, this may result in an issue when the triggering DCI 230 includes a CSI request associated with a carrier of a dormant cell. In the non-limiting example illustrated in FIG. 2A, this may include triggering DCI 230 including a CSI request corresponding to CC1 of cell 210, CC2 of cell 215, and CC3 of cell 220 (i.e., the dormant SCell in this example). UE 225 may not support aperiodic CSI reporting for a dormant SCell. This results in the behavior of UE 225 being undefined when an aperiodic CSI triggering DCI (e.g., triggering DCI 230) indicates a CSI report configuration (CSI-ReportConfig) with the "carrier" field associated with a dormant SCell (which may occur).

Accordingly aspects of the described techniques provide various mechanisms which may be implemented in wireless communications system 200 to address the issue when the CSI report configuration includes a "carrier" field associated with a dormant SCell (e.g., triggering DCI 230 includes CSI-ReportConfig with the "carrier" field associated with CC3). For example, UE 225 may identify or otherwise determine the cell measurements supported by UE 225. Broadly, the cell measurements supported by UE 225 may be associated with UE 225 supporting CSI measurements of a dormant SCell in the cell group. In some aspects, this may include UE 225 determining that its supported cell measure-ment does not support measurement of dormant SCell(s) within the cell group. UE 225 may receive the DCI trigger-ing CSI-RS measurements on a set of cell(s) in the cell group (e.g., cell 210, cell 215, and cell 220 in the example illustrated in FIG. 2A). Accordingly, the set of cell(s) triggered by triggering DCI 230 may include a dormant SCell (e.g., cell 220). UE 225 may perform the CSI-RS measurements on one or more cells in the set of cell(s) according to the cell measurement supported by UE 225. In this first option, this may include UE 225 discarding the triggering DCI 230 based on the triggering of the dormant cell(s) within the cell group. Accordingly in this first option, UE 225 may refrain from identify CSI for each of the one or more cells based on the CSI-RS measurements (e.g., ignore the triggering DCI).

Accordingly, UE 225 may be configured such that it does not expect the network to transmit an aperiodic CSI trig-gering DCI (e.g., using DCI format 0_1, DCI format 1_1, other format) that indicates the CSI report configuration (e.g., CSI-ReportConfig) with a "carrier" field associated with a dormant SCell. In some aspects, UE 225 performing the CSI measurements according to the cell measurements supported by UE 225 may include UE 225 not performing (e.g., refraining from performing or discarding the DCI) the CSI-RS measurements based on the DCI triggering CSI measurements on the dormant SCell. That is, if UE 225 receives a DCI that triggers an aperiodic CSI reporting for any dormant SCell, UE 225 may discard the DCI. Accord-ingly, UE 225 may refrain from performing CSI-RS mea-surements on the cell(s) (e.g., on any cells) in the cell group based on triggering DCI 230 indicating a dormant SCell.

Figure 3:
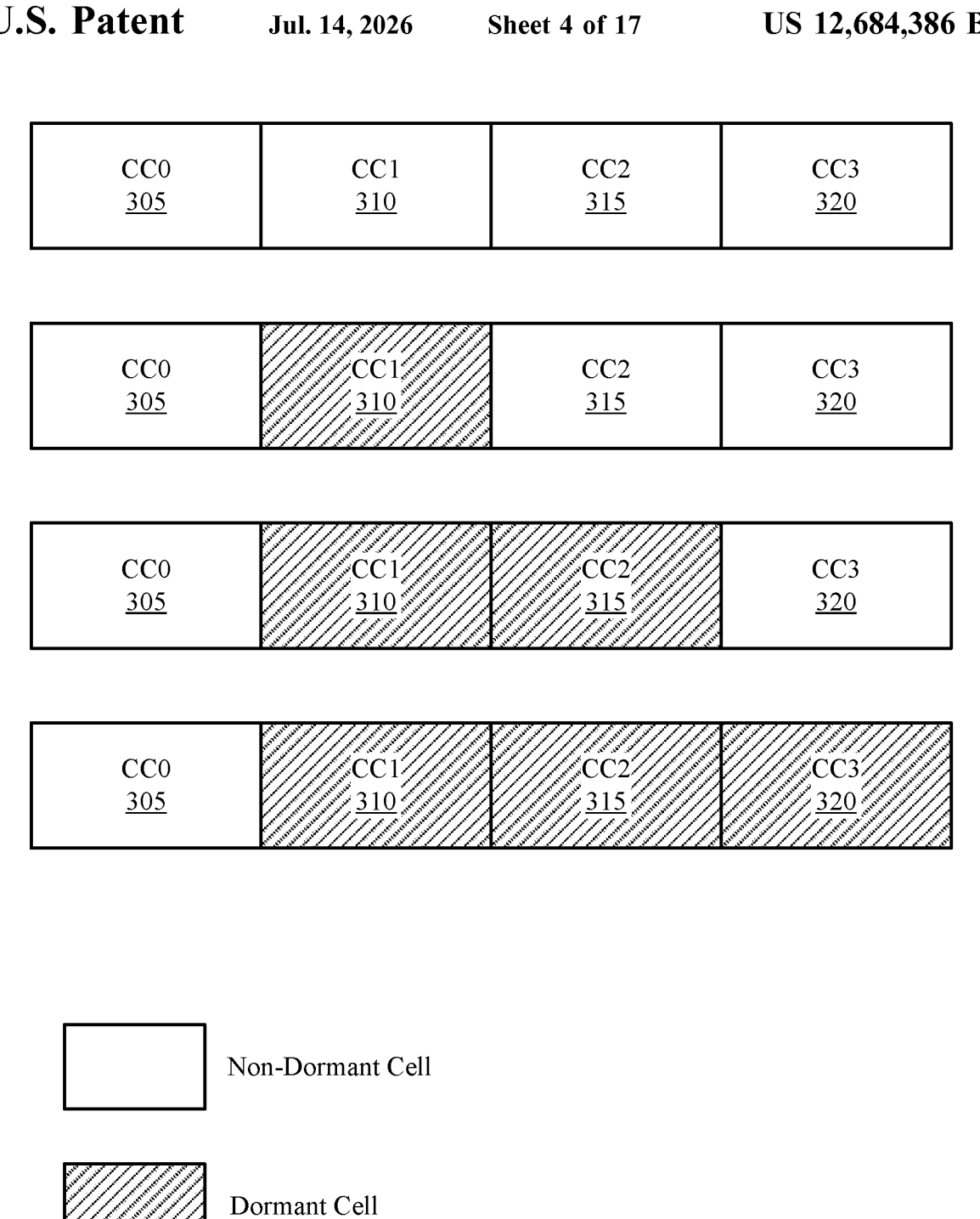
FIG. 3 illustrates an example of a carrier configuration that supports CSI-RS triggering when SCell dormancy is configured in accordance with aspects of the present disclosure.

FIG. 3 illustrates an example of a carrier configuration 300 that supports CSI-RS triggering when SCell dormancy is configured in accordance with aspects of the present disclosure. In some examples, carrier configuration 300 may implement aspects of wireless communications systems 100 and/or 200. Aspects of carrier configuration 300 may be implemented by or at a UE and/or base station (e.g., when the base station is acting as, or otherwise associated with, a cell within a cell group), which may be examples of the corresponding devices described herein.

As discussed above, aspects of the described techniques provide for a mechanism enabling a UE to, based on its supported cell measurement, perform CSI-RS measure-ments on one or more cells in a set of cells triggered by a DCI. That is, the DCI may trigger CSI-RS measurements for a set of cells in the cell group configured for the UE, with at least one cell in the cell group being in a dormant mode. For example, the DCI may carry or otherwise convey a CSI report configuration having a "carrier" field associated with the dormant SCell in the cell group. In the first option discussed with reference to FIG. 2A, the UE may, based on the DCI triggering aperiodic CSI-RS measurements on a dormant SCell, discard the DCI and refrain from performing the CSI-RS measurements. That is, in the first option the UE may not perform CSI-RS measurements for any cells in the cell group triggered by the DCI.

Accordingly, the UE may treat reception of a triggering DCI having a CSI report configuration with a carrier field associated with a dormant SCell as an error case, and therefore ignore or otherwise discard the DCI. That is, if the UE receives the DCI that triggers CSI reporting for any dormant SCell the UE simply discards the DCI. Generally, this first option discussed with reference to FIG. 2A may be applied when some SCells in the cell group are dormant. This may impact configurability of aperiodic CSI reporting. That is, the "carrier" field in the CSI report configuration indicates which downlink carrier the CSI report is targeting (e.g., which carrier is to be measured and reported for, including at least one carrier associated with a dormant SCell). For N cells in the cell group (e.g., PCell+SCell(s)) configured for the UE, there may be at least $M=2^{N-1}$ (e.g., 32,768 when N=16) combinations of CSI aperiodic trigger states (e.g., CSI-AperiodicTriggerState) depending on whether each SCell is triggered or not. In some wireless communication systems, the maximum supported number of combinations is only 128, which is a rather small subset of all of the available combinations. The network may down select the subset from M by considering frequency bandwidth relationship (e.g., intra-frequency/inter-frequency) among carriers, for example. However, when SCell dormancy is configured, the number of CSI aperiodic trigger states may be increased due to some cells being in the dormant mode (e.g., if the first option discussed with reference to FIG. 2A is adopted). In this situation, having a maximum number of 128 may become inefficient.

Carrier configuration 300 illustrates an example of how the number of combinations expands according to the first option discussed with reference to FIG. 2A when some SCell(s) are dormant. For example, the cell group configured for the UE may include a PCell associated with CC 305 (e.g., CC0), a SCell associated with CC 310 (e.g., CC1), an SCell associated with CC 315 (e.g., CC2), and an SCell associated with CC 320 (e.g., CC 3). Carrier configuration 300 illustrates four non-limiting examples of different carrier combinations when one or more SCell(s) in the cell group are dormant.

For example, in a first configuration illustrated in the top row, dormancy is not configured for any SCells in the cell group. That is, one CSI aperiodic trigger state may include cells (e.g., CC0, CC1, CC2, CC3) when each cell triggered by the DCI is in the non-dormant mode. If the network were not allowed to include CSI aperiodic report configurations for any dormant SCells in the triggering DCI, depending on how many SCells are configured to be dormant, the network may configure at least four different CSI aperiodic trigger states, each indicating report configurations for only non-dormant SCells. Changes to SCell dormancy over time may include additional trigger states being configured.

For example, in a second configuration illustrated in the second row, the SCell associated with CC1 is in a dormant mode. In a third configuration illustrated in the third row, the SCells associated with CC1 and CC2 are in dormant modes. In a fourth configuration illustrated in the bottom row, the SCells associated with CC1, CC2, and CC3 are all in dormant modes. In some aspects, this also may be applied to MAC CE mapping from up to 128 configured trigger states to the up to 64 code points of the "CSI requests" field of the aperiodic CSI triggering DCI.

In some wireless communication systems, the network may reconfigure the up to 128 trigger states using RRC messages and/or remap 64 configured trigger states to DCI "CSI request" code points when SCells are switched between dormancy and non-dormancy. However, this may not work in every situation because the dormancy switching may be based on DCI, which is much quicker than RRC configuration or MAC CE signaling, and hence may take place more often to follow the traffic pattern variation.

Accordingly, another option (e.g., a second option) may include the UE expecting that the network can send an aperiodic CSI triggering DCI (e.g., DCI format 0_1, DCI format 1_1, or other format) that indicates a CSI report configuration (e.g., CSI-ReportConfig) with a "carrier" field associated with a dormant SCell. In this second option, the UE may ignore the CSI report configuration including the "carrier" field associated with the dormant SCell and, instead, perform CSI measurements and reporting for other cells triggered by the DCI. For example, the UE may identify a CSI report configuration associated with the dormant SCell and refrain from performing the CSI-RS measurements indicated in the CSI report configuration based at least in some aspects, on the DCI triggering CSI-RS measurements on the dormant SCell. In some examples, the UE may perform CSI measurement and reporting according to CSI report configurations identified in the triggering DCI that are associated with non-dormant cell(s) in the cell group. That is, in this second option the UE may discard any CSI report configuration(s) in the triggering DCI that include dormant SCell(s) and, instead, perform the measurements and reporting for CSI report configuration(s) in the triggering DCI that include non-dormant SCell(s) within the cell group. Accordingly, this second option allows the UE to receive a triggering DCI that includes CSI report configuration(s) for a dormant SCell.

A third option, may include the UE not expecting the network to send an aperiodic CSI triggering DCI (e.g., using DCI format 0_1, DCI format 1_1, or other format) that indicates a CSI report configuration (e.g., CSI-ReportConfig) with a "carrier" field associated with a dormant SCell for every CSI report configuration indicated by the DCI. That is, in the second option discussed above the UE can discard CSI report configuration(s) in the triggering DCI that identify dormant SCell(s). This approach may, in some situations, result in the UE discarding all CSI report configuration(s) indicated in the triggering DCI when each CSI report configuration identifies a dormant SCell. In this third option, the triggering DCI will be expected to have at least one CSI report configuration that only identifies non-dormant SCell (s) within the cell group. Accordingly, the UE may identify or otherwise determine a CSI report configuration associated with an non-dormant SCell in the cell group and perform the CSI-RS measurements for the cell(s) associated with the CSI report configuration accordingly.

In some aspects, the first and/or second options discussed above may be applied based on the number of SCell(s) in the cell group configured for the UE and/or based on the number of active SCell(s) in the cell group configured for the UE. For example, if the number of configured cells in the cell group is small, the UE may adopt the first option discussed with reference to FIG. 2A with no loss of configurability. However, efficiency may be improved by discarding fewer DCIs due to an unnecessarily large number of triggering states indicated by the CSI request field. Accordingly, one variation may include adaptive selection between the first option discussed with reference to FIG. 2A and/or the second option discussed above with reference to FIG. 3. For example, if the number of configured active SCells in the cell group is less than or equal to a threshold (e.g., six), the UE may adopt the first option and discard the DCI. The non-limiting example of a threshold of six may assume seven cells in the cell group (e.g., PCell+six SCells) may have at most 128 combinations. Accordingly, the UE may determine that the number of active SCells in the cell group is less than the threshold and refrain from performing the CSI-RS measurements in response (e.g., may discard the DCI).

Additionally or alternatively, another variation may include the number of configured SCells in the cell group being less than or equal to a threshold (e.g., six), the UE may adopt the first option and discard the DCI. However, if the UE determines that the number of configured active SCells in the cell group and/or the number of configured SCells in the cell group are less than the corresponding threshold, the UE may adopt the second option discussed above and refrain from performing the CSI-RS measurements identified in the CSI report configuration based on the DCI triggering CSI measurements on the dormant SCell.

It is to be understood that the discussions above relating to a particular DCI formats are non-limiting. That is, the described techniques are not limited to particular DCI format, such as the DCI format 0_1, DCI format 1_1. However, such techniques may be implemented for any DCI format used for aperiodic CSI triggering (e.g., such as downlink scheduling DCI format 1_1). Accordingly, the DCI triggering CSI-RS measurements for the cell group may include a downlink grant and/or an uplink grant triggering the CSI-RS measurements.

Figure 4:
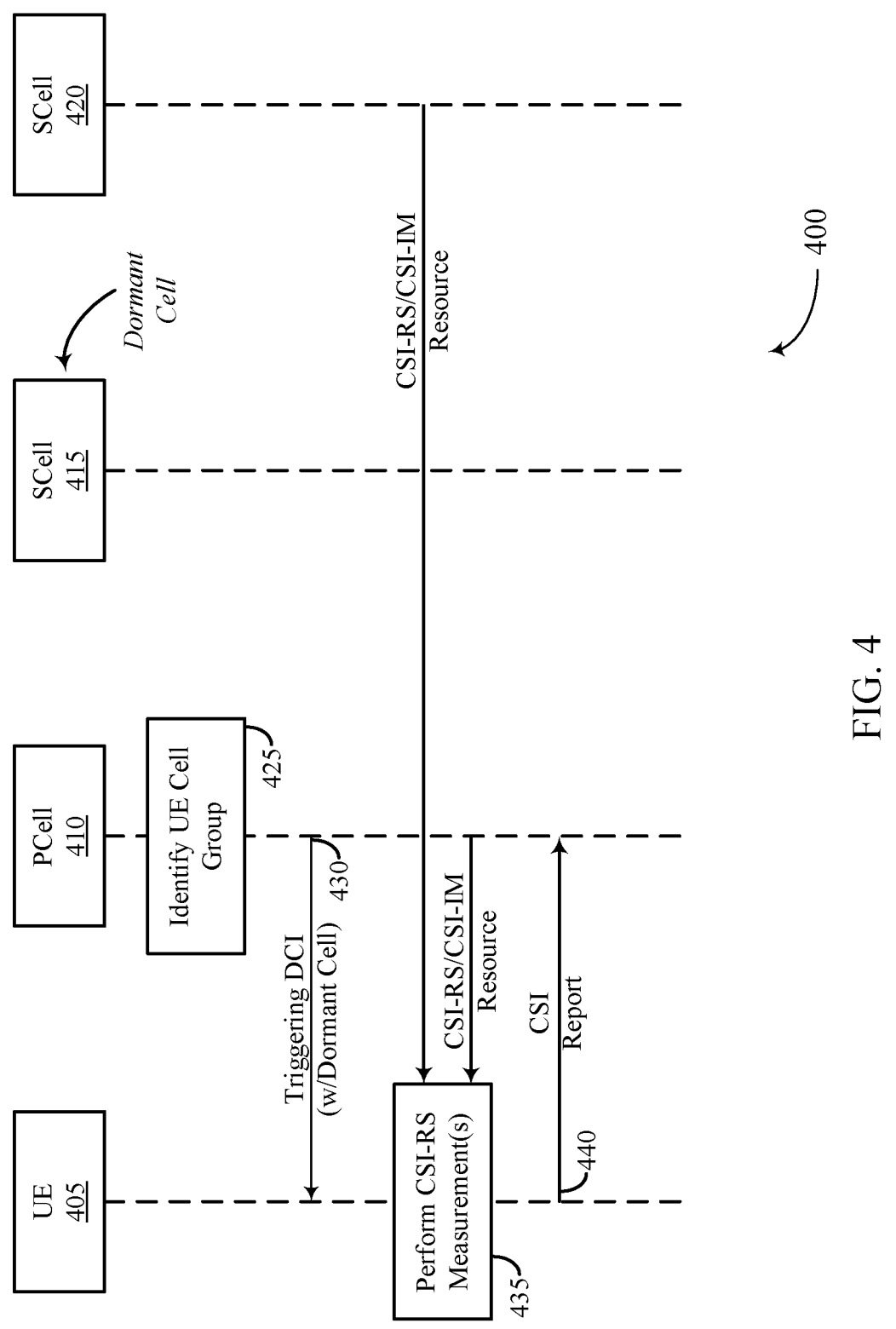
FIG. 4 illustrates an example of a process that supports CSI-RS triggering when SCell dormancy is configured in accordance with aspects of the present disclosure.

FIG. 4 illustrates an example of a process 400 that supports CSI-RS triggering when SCell dormancy is configured in accordance with aspects of the present disclosure. In some examples, process 400 may implement aspects of wireless communications systems 100 and/or 200 and/or carrier configuration 300. Aspects of process 400 may be implemented by or implemented at UE 405, PCell 410, SCell 415, and/or SCell 420, which may be examples of the corresponding devices described herein. In some aspects, PCell 410, SCell 410, and SCell 415 may define or otherwise be associated with a cell group configured for UE 405. In some aspects, SCell 420 may be in an active mode (e.g., a non-dormant mode) and SCell 415 may be in a dormant mode.

At 425, PCell 410 may identify or otherwise determine a cell group configured for UE 405. For example, PCell 410 may transmit or otherwise convey a configuration signal (e.g., an RRC signal) to UE 405 configuring the cell group.

At 430, PCell 410 may transmit (and UE 405 may receive) a DCI triggering CSI-RS measurements on a set of cells in the cell group. Generally, the set of cells may include one, some, or all of the SCells configured for the cell group. In some aspects, the triggering DCI may include one or more CSI report configurations, with each CSI report configuration identifying one or more SCells in the cell group. In the example illustrated in process 400, the triggering DCI may include CSI report configuration identifying PCell 410 and/ or SCell 415 (which is in the dormant mode in this example), and SCell 420 as the set of cells for UE 405 to perform CSI measurement and reporting.

Accordingly and at 435, UE 405 may perform CSI-RS measurements on one or more cells in the set of cells according to the cell measurements supported by UE 405 to identify CSI for each of the one or more cells. For example, the triggering DCI may identify resources (e.g., CSI-RS and/or CSI-IM resources) for carrier(s) associated with each triggered cell identified in the CSI report configuration.

In some aspects, performing the CSI-RS measurements may be based on the cell measurements supported by UE 405. For example, the first option (discussed above with reference to FIG. 2A) may include UE 405 discarding the DCI and refraining from performing the CSI-RS measurements on any cell in the set of cells based on the DCI triggering CSI-RS measurements on the dormant SCell (e.g., on SCell 415). In the second option (discussed above with reference to FIG. 3), UE 405 may discard CSI report configuration(s) indicated in the triggering DCI (e.g., refrain from performing CSI-RS measurements on cell(s) identified in those CSI report configuration(s)), but may perform CSI-RS measurements on active cell(s) identified in other CSI report configuration(s). That is, UE 405 may discard any CSI report configuration in the DCI that identifies the dormant cell. In the third option (also discussed above with reference to FIG. 3), UE 405 may expect at least one CSI report configuration indicated in the triggering DCI to be associated with active SCells in the cell group. That is, UE 405 may identify at least one CSI report configuration associated with non-dormant SCell(s) and perform the CSI-RS measurements on the cell(s) associated with the at least one CSI report configuration.

In some aspects, UE 405 may adopt the first option or the second option based on the number of cells configured in the cell group and/or based on the number of active cells in the cell group. For example, if UE 405 determines that the number of configured SCell(s) and/or active SCell(s) in the cell group is less than a threshold, then UE 405 may adopt option one and discard the triggering DCI. Conversely, if UE 405 determines that the number of configured SCell(s) and/or active SCell(s) in the cell group satisfies the threshold, UE 405 may adopt option two and discard CSI report configuration(s) in the DCI that identify dormant SCells.

Accordingly and at 440, UE 405 may transmit (and PCell 410 may receive) a CSI report indicating CSI for one or more cells in the set of cells (e.g., for active cell(s) in the cell group). For example, the CSI report may indicate, for the active cell(s), RSRP, RSSI, CQI, CSI, interference information, and the like, for the corresponding carrier(s).

Figure 5:
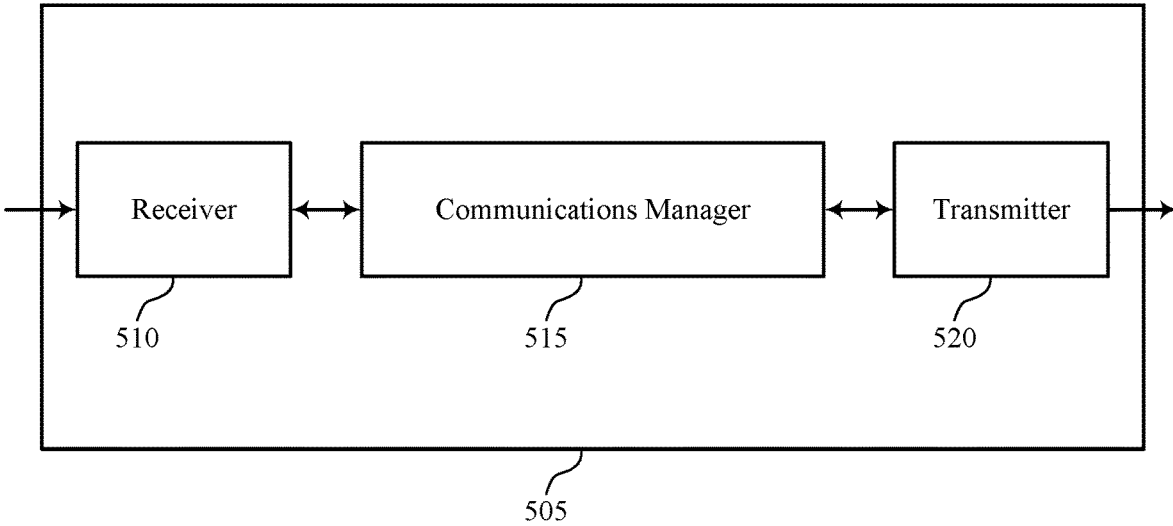
FIGS. 5 and 6 show block diagrams of devices that support CSI-RS triggering when SCell dormancy is configured in accordance with aspects of the present disclosure.

FIG. 5 shows a block diagram 500 of a device 505 that supports CSI-RS triggering when SCell dormancy is configured in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, or information related to CSI-RS triggering for SCell dormancy). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a cell measurement supported by the UE, the cell measurement associated with the UE supporting CSI measurements of a dormant SCell in a cell group, receive a DCI triggering CSI-RS measurements for a set of cells in the cell group, the set of cells including the dormant SCell, and perform, based on the DCI, the CSI-RS measurements on one or more cells in the set of cells according to the cell measurement supported by the UE to identify CSI for each of the one or more cells. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
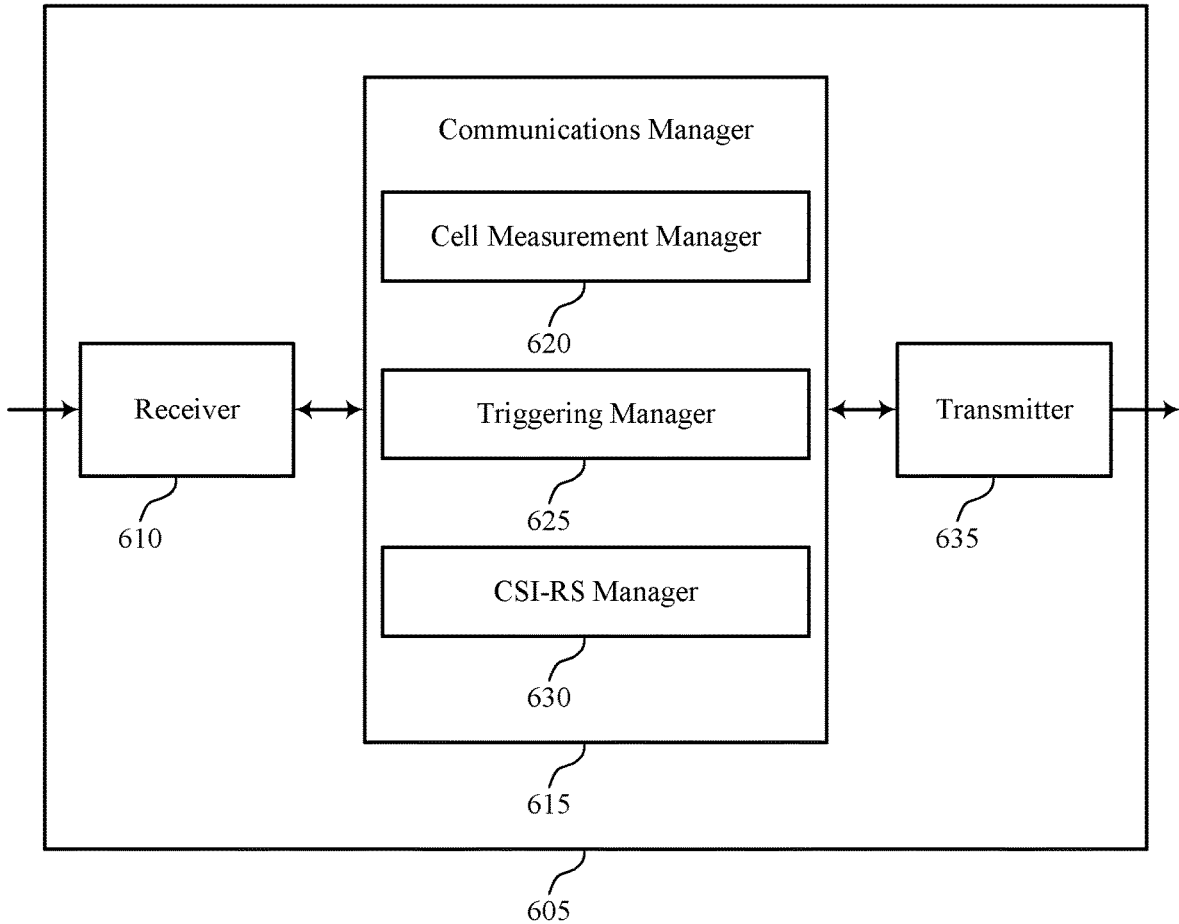

FIG. 6 shows a block diagram 600 of a device 605 that supports CSI-RS triggering when SCell dormancy is configured in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, or information related to CSI-RS triggering for SCell dormancy). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a cell measurement manager 620, a triggering manager 625, and a CSI-RS manager 630. The communications manager 615 may be an example of aspects of the communications manager 810 described herein.

The cell measurement manager 620 may identify a cell measurement supported by the UE, the cell measurement associated with the UE supporting CSI measurements of a dormant SCell in a cell group.

The triggering manager 625 may receive a DCI triggering CSI-RS measurements for a set of cells in the cell group, the set of cells including the dormant SCell.

The CSI-RS manager 630 may perform, based on the DCI, the CSI-RS measurements on one or more cells in the set of cells according to the cell measurement supported by the UE to identify CSI for each of the one or more cells.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
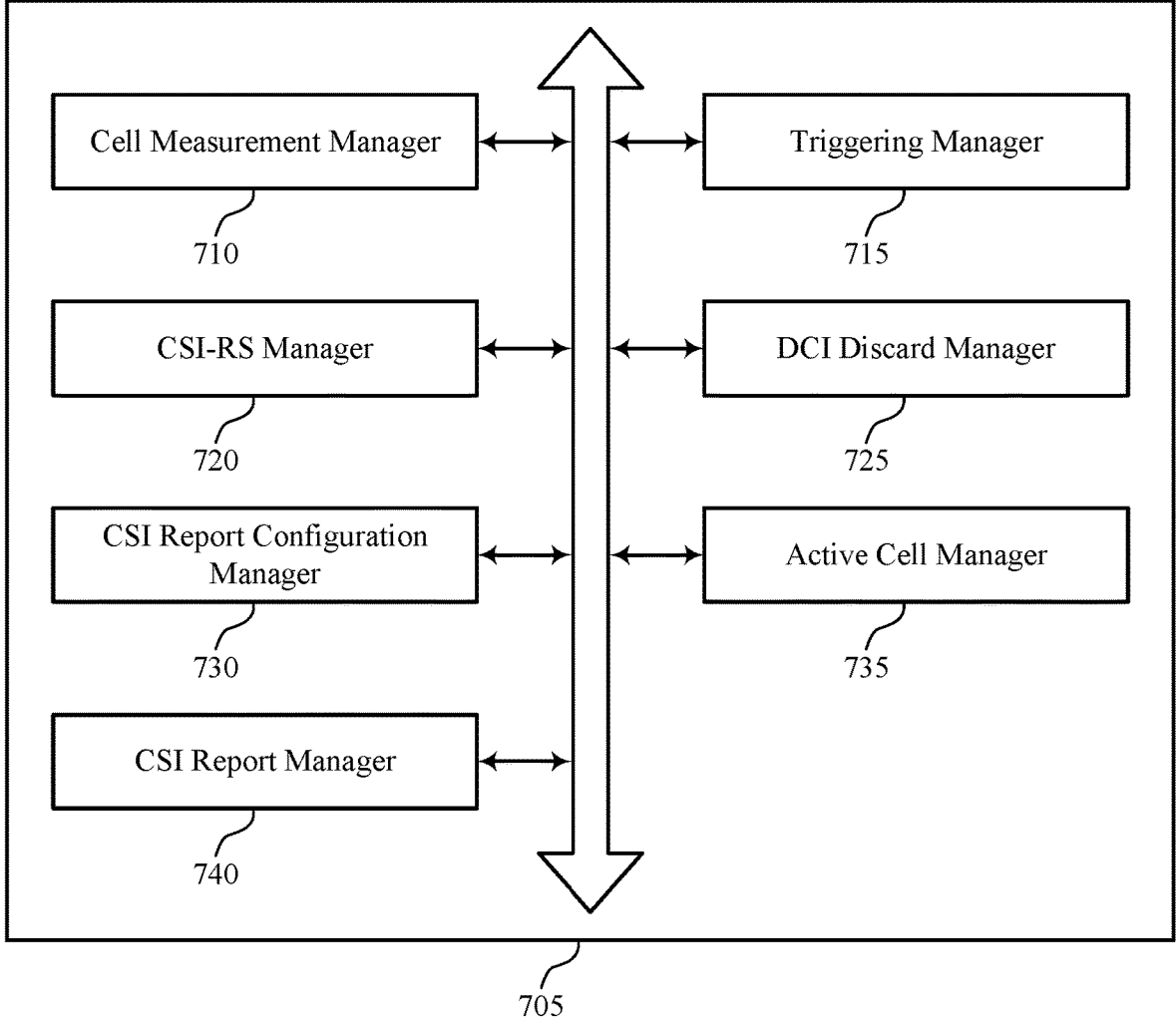
FIG. 7 shows a block diagram of a communications manager that supports CSI-RS triggering when SCell dormancy is configured in accordance with aspects of the present disclosure.

FIG. 7 shows a block diagram 700 of a communications manager 705 that supports CSI-RS triggering when SCell dormancy is configured in accordance with aspects of the present disclosure. The communications manager 705 may be an example of aspects of a communications manager 515, a communications manager 615, or a communications manager 810 described herein. The communications manager 705 may include a cell measurement manager 710, a triggering manager 715, a CSI-RS manager 720, a DCI discard manager 725, a CSI report configuration manager 730, an active cell manager 735, and a CSI report manager 740. Each of these modules may communicate, directly or indirectly, with one another (e.g., via one or more buses).

The cell measurement manager 710 may identify a cell measurement supported by the UE, the cell measurement associated with the UE supporting CSI measurements of a dormant SCell in a cell group.

The triggering manager 715 may receive a DCI triggering CSI-RS measurements for a set of cells in the cell group, the set of cells including the dormant SCell. In some cases, the DCI includes a downlink grant triggering the CSI-RS measurements or an uplink grant triggering the CSI-RS measurements.

The CSI-RS manager 720 may perform, based on the DCI, the CSI-RS measurements on one or more cells in the set of cells according to the cell measurement supported by the UE to identify CSI for each of the one or more cells.

The DCI discard manager 725 may determine that the DCI includes at least one CSI report configuration associated with the dormant SCell. In some examples, the DCI discard manager 725 may discard the DCI and refraining from performing the CSI-RS measurements on the cells in the set of cells based on the DCI triggering CSI measurements on the dormant SCell. In some examples, the DCI discard manager 725 may determine that a number of active cells in the cell group is less than a threshold. In some examples, the DCI discard manager 725 may discard the DCI and refraining from performing the CSI-RS measurements based on the number of active cells being less than the threshold and the DCI triggering CSI-RS measurements on the dormant SCell.

In some examples, the DCI discard manager 725 may determine that a number of cells in the cell group is less than a threshold. In some examples, the DCI discard manager 725 may discard the DCI and refraining from performing the CSI-RS measurements based on the number of cells being less than the threshold and the DCI triggering CSI-RS measurements on the dormant SCell.

The CSI report configuration manager 730 may determine that at least one CSI report configuration identified in the DCI is associated with the dormant SCell. In some examples, the CSI report configuration manager 730 may refrain from performing the CSI-RS measurements on cells in the set of cells identified in the at least one CSI report configuration associated with dormant cells based on the DCI triggering CSI measurements on the dormant SCell. In some examples, the CSI report configuration manager 730 may perform the CSI-RS measurements on cells in the set of cells identified in one or more other CSI report configurations associated with non-dormant cells based on the DCI triggering CSI measurements on the dormant SCell.

In some examples, the CSI report configuration manager 730 may determine that a number of active cells in the cell group satisfies a threshold. In some examples, the CSI report configuration manager 730 may perform the CSI-RS measurements on cells in the set of cells identified in the one or more other CSI report configurations associated with non-dormant cells based on the number of active cells satisfying the threshold and the DCI triggering CSI-RS measurements on the dormant SCell.

In some examples, the CSI report configuration manager 730 may determine that a number of cells in the cell group satisfies a threshold. In some examples, the CSI report configuration manager 730 may perform the CSI-RS measurements identified on cells in the set of cells identified in the one or more other CSI report configurations associated with non-dormant cells based on the number of cells satisfying the threshold and the DCI triggering CSI-RS measurements on the dormant SCell.

The active cell manager 735 may identify at least one CSI report configuration identified in the DCI is associated with non-dormant SCells in the cell group. In some examples, the active cell manager 735 may perform the CSI-RS measurements on the cells associated with the at least one CSI report configuration associated with non-dormant cells based on the CSI report configuration being associated with the non-dormant SCells and the DCI triggering CSI measurements on the dormant SCell.

The CSI report manager 740 may transmit a CSI report indicating the CSI for the one or more cells in the set of cells, where the CSI report indicates the CSI for the active cells in the cell group.

Figure 8:
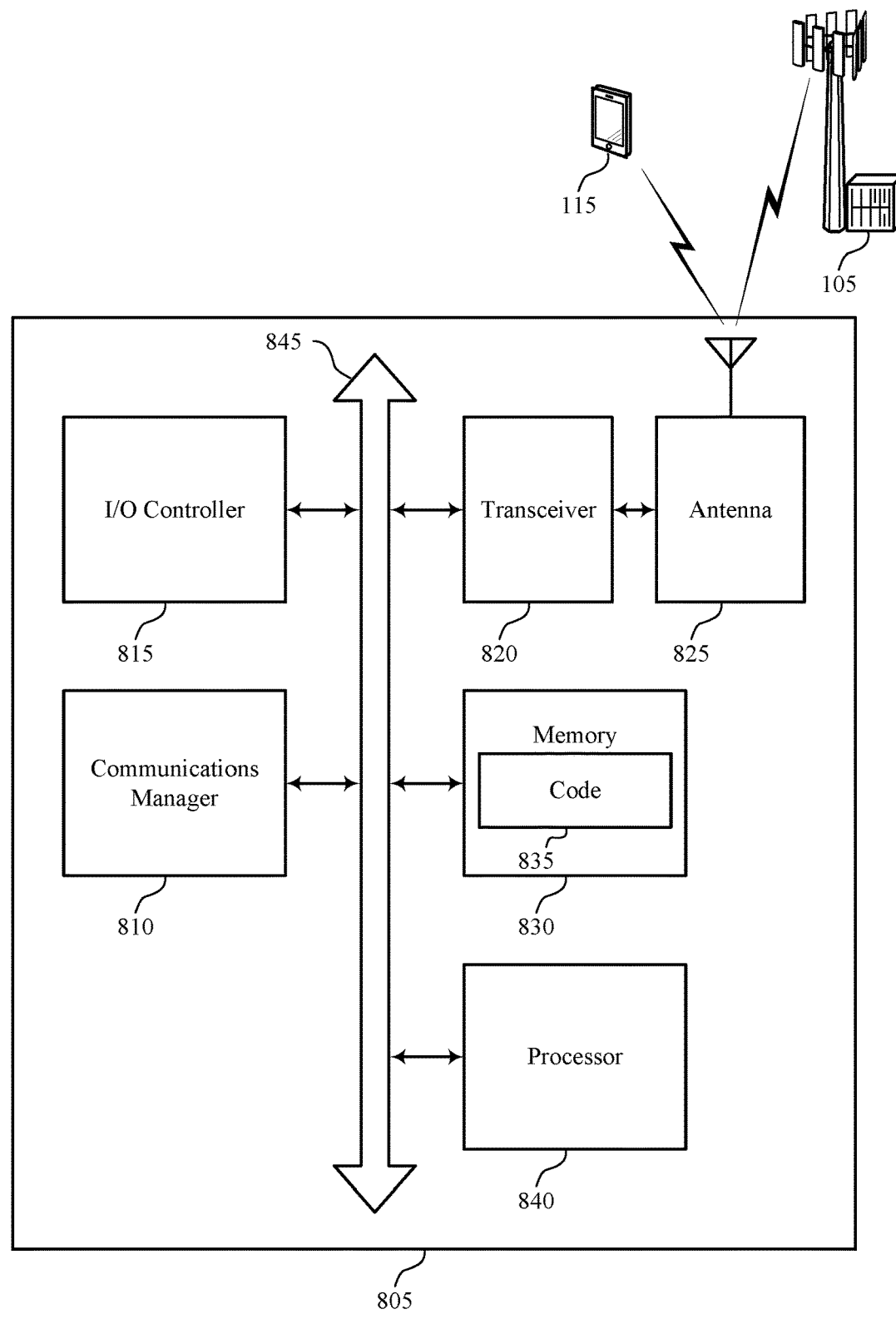
FIG. 8 shows a diagram of a system including a device that supports CSI-RS triggering when SCell dormancy is configured in accordance with aspects of the present disclosure.

FIG. 8 shows a diagram of a system 800 including a device 805 that supports CSI-RS triggering when SCell dormancy is configured in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a cell measurement supported by the UE, the cell measurement associated with the UE supporting CSI measurements of a dormant SCell in a cell group, receive a DCI triggering CSI-RS measurements for a set of cells in the cell group, the set of cells including the dormant SCell, and perform, based on the DCI, the CSI-RS measurements on one or more cells in the set of cells according to the cell measurement supported by the UE to identify CSI for each of the one or more cells.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting CSI-RS triggering for SCell dormancy).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
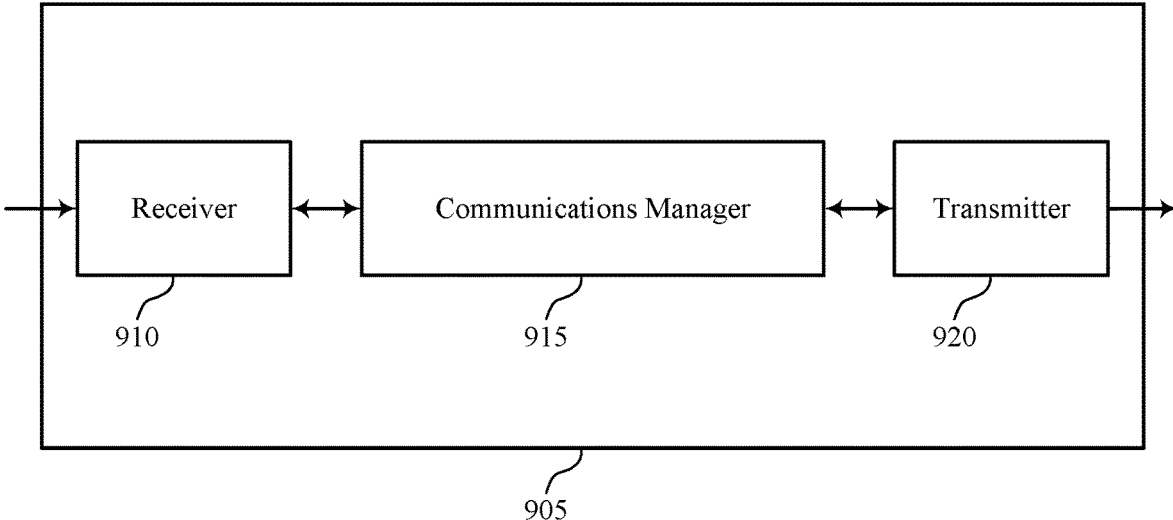
FIGS. 9 and 10 show block diagrams of devices that support CSI-RS triggering when SCell dormancy is configured in accordance with aspects of the present disclosure.

FIG. 9 shows a block diagram 900 of a device 905 that supports CSI-RS triggering when SCell dormancy is configured in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, or information related to CSI-RS triggering for SCell dormancy). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a cell group configured for a UE, transmit a DCI to the UE triggering CSI-RS measurements on a set of cells in the cell group, the set of cells including a dormant SCell, and receive a CSI report from the UE indicating CSI for one or more cells in the set of cells, the one or more cells including active cells of the cell group. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
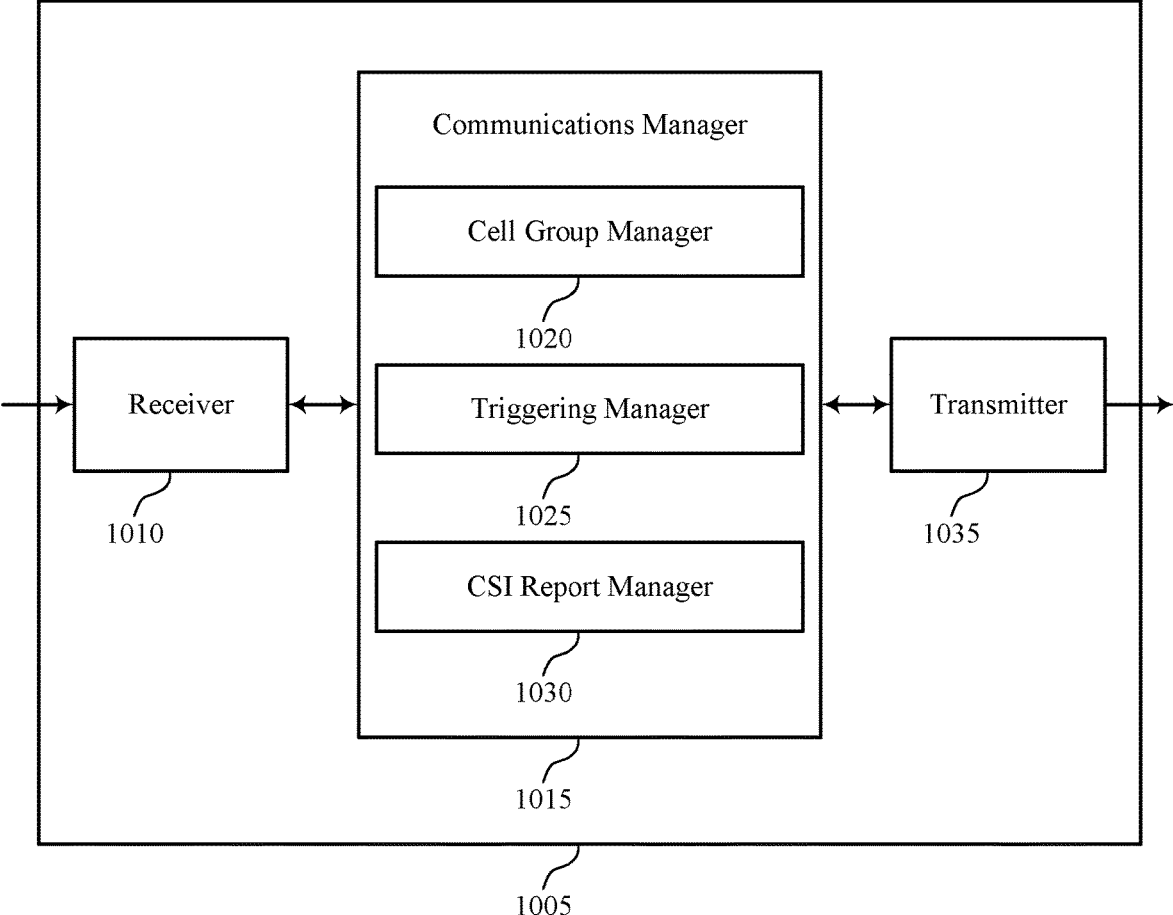

FIG. 10 shows a block diagram 1000 of a device 1005 that supports CSI-RS triggering when SCell dormancy is configured in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to CSI-RS triggering for SCell dormancy). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a cell group manager 1020, a triggering manager 1025, and a CSI report manager 1030. The communications manager 1015 may be an example of aspects of the communications manager 1210 described herein.

The cell group manager 1020 may identify a cell group configured for a UE.

The triggering manager 1025 may transmit a DCI to the UE triggering CSI-RS measurements on a set of cells in the cell group, the set of cells including a dormant SCell.

The CSI report manager 1030 may receive a CSI report from the UE indicating CSI for one or more cells in the set of cells, the one or more cells including active cells of the cell group.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
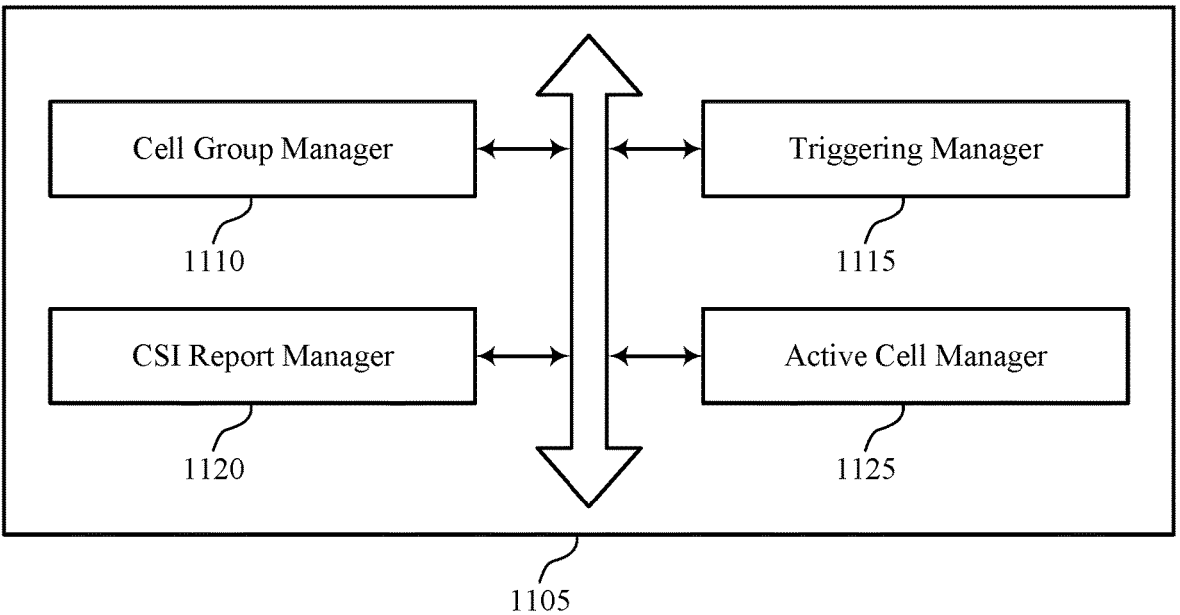
FIG. 11 shows a block diagram of a communications manager that supports CSI-RS triggering when SCell dormancy is configured in accordance with aspects of the present disclosure.

FIG. 11 shows a block diagram 1100 of a communications manager 1105 that supports CSI-RS triggering when SCell dormancy is configured in accordance with aspects of the present disclosure. The communications manager 1105 may be an example of aspects of a communications manager 915, a communications manager 1015, or a communications manager 1210 described herein. The communications manager 1105 may include a cell group manager 1110, a triggering manager 1115, a CSI report manager 1120, and an active cell manager 1125. Each of these modules may communicate, directly or indirectly, with one another (e.g., via one or more buses).

The cell group manager 1110 may identify a cell group configured for a UE.

The triggering manager 1115 may transmit a DCI to the UE triggering CSI-RS measurements on a set of cells in the cell group, the set of cells including a dormant SCell.

The CSI report manager 1120 may receive a CSI report from the UE indicating CSI for one or more cells in the set of cells, the one or more cells including active cells of the cell group.

The active cell manager 1125 may receive the CSI report indicating CSI for non-dormant cells in the set of cells that are associated with a CSI report configuration.

Figure 12:
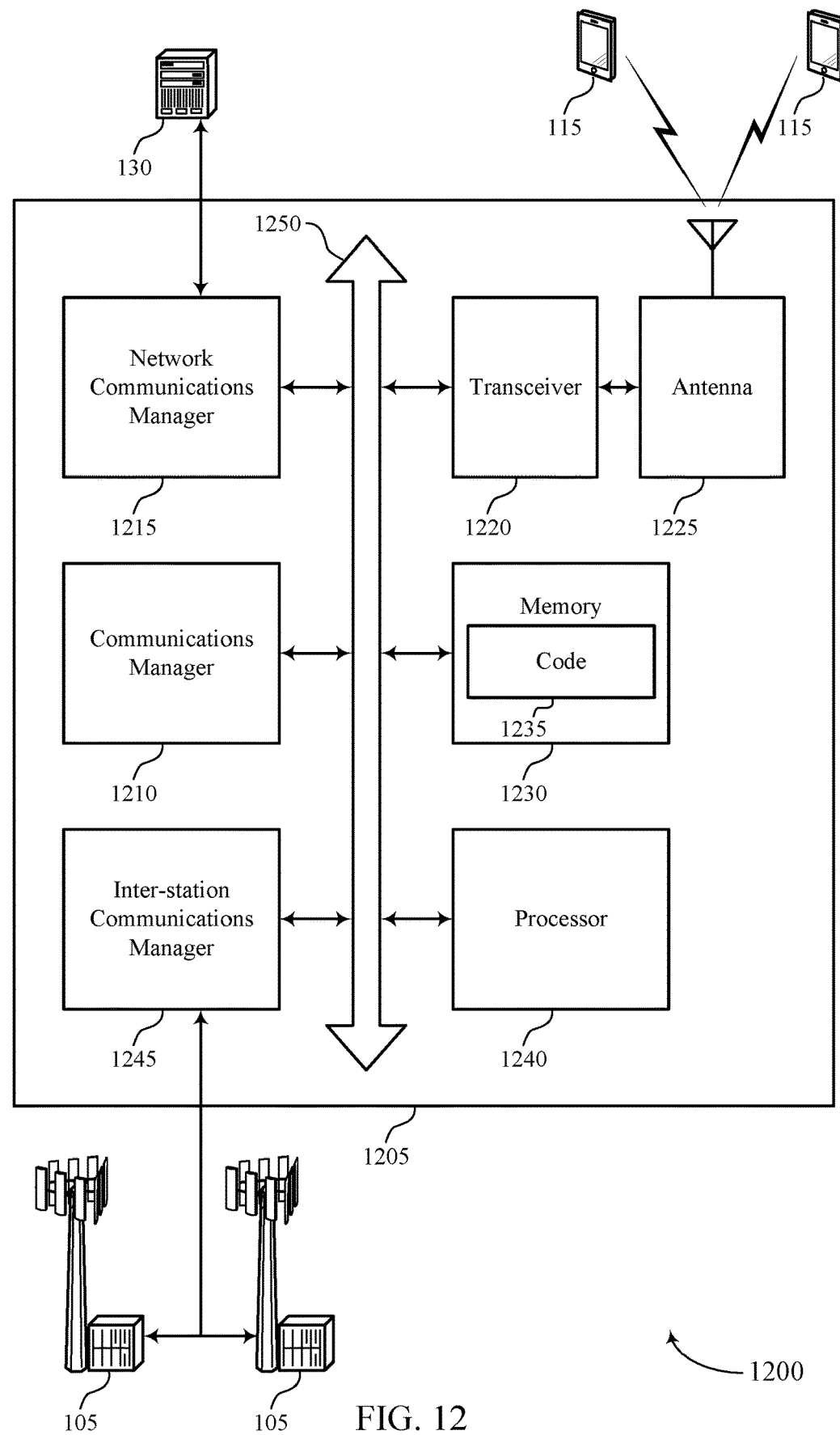
FIG. 12 shows a diagram of a system including a device that supports CSI-RS triggering when SCell dormancy is configured in accordance with aspects of the present disclosure.

FIG. 12 shows a diagram of a system 1200 including a device 1205 that supports CSI-RS triggering when SCell dormancy is configured in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a cell group configured for a UE, transmit a DCI to the UE triggering CSI-RS measurements on a set of cells in the cell group, the set of cells including a dormant SCell, and receive a CSI report from the UE indicating CSI for one or more cells in the set of cells, the one or more cells including active cells of the cell group.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting CSI-RS triggering for SCell dormancy).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a flowchart illustrating a method 1300 that supports CSI-RS triggering when SCell dormancy is configured in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a cell measurement supported by the UE, the cell measurement associated with the UE supporting CSI measurements of a dormant SCell in a cell group. The operations of 1305 may be performed according to the methods described herein. In some examples, aspects of the operations of 1305 may be performed by a cell measurement manager as described with reference to FIGS. 5 through 8.

At 1310, the UE may receive a DCI triggering CSI-RS measurements for a set of cells in the cell group, the set of cells including the dormant SCell. The operations of 1310 may be performed according to the methods described herein. In some examples, aspects of the operations of 1310 may be performed by a triggering manager as described with reference to FIGS. 5 through 8.

At 1315, the UE may perform, based on the DCI, the CSI-RS measurements on one or more cells in the set of cells according to the cell measurement supported by the UE to identify CSI for each of the one or more cells. The operations of 1315 may be performed according to the methods described herein. In some examples, aspects of the operations of 1315 may be performed by a CSI-RS manager as described with reference to FIGS. 5 through 8.

FIG. 14 shows a flowchart illustrating a method 1400 that supports CSI-RS triggering when SCell dormancy is configured in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a cell measurement supported by the UE, the cell measurement associated with the UE supporting CSI measurements of a dormant SCell in a cell group. The operations of 1405 may be performed according to the methods described herein. In some examples, aspects of the operations of 1405 may be performed by a cell measurement manager as described with reference to FIGS. 5 through 8.

At 1410, the UE may receive a DCI triggering CSI-RS measurements for a set of cells in the cell group, the set of cells including the dormant SCell. The operations of 1410 may be performed according to the methods described herein. In some examples, aspects of the operations of 1410 may be performed by a triggering manager as described with reference to FIGS. 5 through 8.

At 1415, the UE may perform, based on the DCI, the CSI-RS measurements on one or more cells in the set of cells according to the cell measurement supported by the UE to identify CSI for each of the one or more cells. The operations of 1415 may be performed according to the methods described herein. In some examples, aspects of the operations of 1415 may be performed by a CSI-RS manager as described with reference to FIGS. 5 through 8.

At 1420, the UE may determine that the DCI includes at least one CSI report configuration associated with the dormant SCell. The operations of 1420 may be performed according to the methods described herein. In some examples, aspects of the operations of 1420 may be performed by a DCI discard manager as described with reference to FIGS. 5 through 8.

At 1425, the UE may discard the DCI and refraining from performing the CSI-RS measurements on the cells in the set of cells based on the DCI triggering CSI measurements on the dormant SCell. The operations of 1425 may be performed according to the methods described herein. In some examples, aspects of the operations of 1425 may be performed by a DCI discard manager as described with reference to FIGS. 5 through 8.

FIG. 15 shows a flowchart illustrating a method 1500 that supports CSI-RS triggering when SCell dormancy is configured in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a cell measurement supported by the UE, the cell measurement associated with the UE supporting CSI measurements of a dormant SCell in a cell group. The operations of 1505 may be performed according to the methods described herein. In some examples, aspects of the operations of 1505 may be performed by a cell measurement manager as described with reference to FIGS. 5 through 8.

At 1510, the UE may receive a DCI triggering CSI-RS measurements for a set of cells in the cell group, the set of cells including the dormant SCell. The operations of 1510 may be performed according to the methods described herein. In some examples, aspects of the operations of 1510 may be performed by a triggering manager as described with reference to FIGS. 5 through 8.

At 1515, the UE may perform, based on the DCI, the CSI-RS measurements on one or more cells in the set of cells according to the cell measurement supported by the UE to identify CSI for each of the one or more cells. The operations of 1515 may be performed according to the methods described herein. In some examples, aspects of the operations of 1515 may be performed by a CSI-RS manager as described with reference to FIGS. 5 through 8.

At 1520, the UE may determine that at least one CSI report configuration identified in the DCI is associated with the dormant SCell. The operations of 1520 may be performed according to the methods described herein. In some examples, aspects of the operations of 1520 may be performed by a CSI report configuration manager as described with reference to FIGS. 5 through 8.

At 1525, the UE may refrain from performing the CSI-RS measurements on cells in the set of cells identified in the at least one CSI report configuration associated with dormant cells based on the DCI triggering CSI measurements on the dormant SCell. The operations of 1525 may be performed according to the methods described herein. In some examples, aspects of the operations of 1525 may be performed by a CSI report configuration manager as described with reference to FIGS. 5 through 8.

At 1530, the UE may perform the CSI-RS measurements on cells in the set of cells identified in one or more other CSI report configurations associated with non-dormant cells based on the DCI triggering CSI measurements on the dormant SCell. The operations of 1530 may be performed according to the methods described herein. In some examples, aspects of the operations of 1530 may be performed by a CSI report configuration manager as described with reference to FIGS. 5 through 8.

FIG. 16 shows a flowchart illustrating a method 1600 that supports CSI-RS triggering when SCell dormancy is configured in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify a cell group configured for a UE. The operations of 1605 may be performed according to the methods described herein. In some examples, aspects of the operations of 1605 may be performed by a cell group manager as described with reference to FIGS. 9 through 12.

At 1610, the base station may transmit a DCI to the UE triggering CSI-RS measurements on a set of cells in the cell group, the set of cells including a dormant SCell. The operations of 1610 may be performed according to the methods described herein. In some examples, aspects of the operations of 1610 may be performed by a triggering manager as described with reference to FIGS. 9 through 12.

At 1615, the base station may receive a CSI report from the UE indicating CSI for one or more cells in the set of cells, the one or more cells including active cells of the cell group. The operations of 1615 may be performed according to the methods described herein. In some examples, aspects of the operations of 1615 may be performed by a CSI report manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

identifying a cell measurement supported by the UE, the cell measurement associated with the UE supporting channel state information measurements of a dormant secondary cell in a cell group;

receiving a downlink control information triggering channel state information reference signal measurements for a set of cells in the cell group, the set of cells comprising the dormant secondary cell;

performing, based at least in part on the downlink control information, the channel state information reference signal measurements for active cells in the set of cells according to the cell measurement supported by the UE to identify channel state information for each of the active cells; and transmitting a channel state information report that indicates the channel state information for the active cells in the set of cells, wherein channel state information for the dormant secondary cell is omitted from the channel state information report based at least in part on a number of cells in the cell group satisfying a threshold.

2. The method of claim 1, wherein the performing according to the cell measurement supported by the UE comprises:

determining that at least one channel state information report configuration identified in the downlink control information is associated with the dormant secondary cell;

refraining from performing the channel state information reference signal measurements for cells in the set of cells identified in the at least one channel state information report configuration associated with dormant cells based at least in part on the downlink control information triggering channel state information measurements for the dormant secondary cell; and performing the channel state information reference signal measurements for the active cells in the set of cells identified in one or more other channel state information report configurations associated with the active cells based at least in part on the downlink control information triggering channel state information reference signal measurements for the dormant secondary cell.

3. The method of claim 2, wherein the performing according to the cell measurement supported by the UE comprises:

determining that a number of active cells in the cell group satisfies the threshold; and performing the channel state information reference signal measurements for the active cells in the set of cells identified in the one or more other channel state information report configurations associated with the active cells based at least in part on the number of active cells satisfying the threshold and the downlink control information triggering channel state information reference signal measurements for the dormant secondary cell.

4. The method of claim 2, wherein the performing according to the cell measurement supported by the UE comprises:

determining that the number of cells in the cell group satisfies the threshold; and performing the channel state information reference signal measurements for the active cells in the set of cells identified in the one or more other channel state information report configurations associated with the active cells based at least in part on the number of cells satisfying the threshold and the downlink control information triggering channel state information reference signal measurements for the dormant secondary cell.

5. The method of claim 1, wherein the performing according to the cell measurement supported by the UE comprises:

identifying at least one channel state information report configuration identified in the downlink control information that is associated with active secondary cells in the cell group; and performing the channel state information reference signal measurements for the active cells associated with at least one channel state information report configuration associated with active cells based at least in part on the at least one channel state information report configuration being associated with the active secondary cells and the downlink control information triggering channel state information reference signal measurements for the dormant secondary cell.

6. The method of claim 1, wherein the downlink control information comprises a downlink grant triggering the channel state information reference signal measurements or an uplink grant triggering the channel state information reference signal measurements.

7. A method for wireless communication at a primary cell, comprising:

identifying a cell group configured for a user equipment (UE);

transmitting a downlink control information to the UE triggering channel state information reference signal measurements for a set of cells in the cell group, the set of cells comprising a dormant secondary cell; and receiving a channel state information report from the UE that indicates channel state information for active cells in the set of, wherein channel state information for the dormant secondary cell is omitted from the channel state information report based at least in part on a number of cells in the cell group satisfying a threshold.

8. The method of claim 7, wherein receiving the channel state information report comprises:

receiving the channel state information report that indicates the channel state information for the active cells in the set of cells that are associated with a channel state information report configuration.

9. An apparatus for wireless communication at a user equipment (UE), comprising:

at least one processor, and memory coupled with the at least one processor, the memory storing instructions for the at least one processor to cause the UE to:

identify a cell measurement supported by the UE, the cell measurement associated with the UE supporting channel state information measurements of a dormant secondary cell in a cell group;

receive a downlink control information triggering channel state information reference signal measurements for a set of cells in the cell group, the set of cells comprising the dormant secondary cell;

perform, based at least in part on the downlink control information, the channel state information reference signal measurements for active cells in the set of cells according to the cell measurement supported by the UE to identify channel state information for each of the active cells; and transmit a channel state information report that indicates the channel state information for the active cells in the set of cells, wherein channel state information for the dormant secondary cell is omitted from the channel state information report based at least in part on a number of cells in the cell group satisfying a threshold.

10. The apparatus of claim 9, wherein the instructions for the at least one processor to cause the UE to perform the channel state information reference signal measurements according to the cell measurement supported by the UE comprise instructions for the at least one processor to cause the UE to:

determine that at least one channel state information report configuration identified in the downlink control information is associated with the dormant secondary cell;

refrain from performing the channel state information reference signal measurements for cells in the set of cells identified in the at least one channel state information report configuration associated with dormant cells based at least in part on the downlink control information triggering channel state information measurements on the dormant secondary cell; and perform the channel state information reference signal measurements for the active cells in the set of cells identified in one or more other channel state information report configurations associated with the active cells based at least in part on the downlink control information triggering channel state information reference signal measurements for the dormant secondary cell.

11. The apparatus of claim 10, wherein the instructions for the at least one processor to cause the UE to perform the channel state information reference signal measurements according to the cell measurement supported by the UE comprise instructions for the at least one processor to cause the UE to:

determine that a number of active cells in the cell group satisfies the threshold; and perform the channel state information reference signal measurements for the active cells in the set of cells identified in the one or more other channel state information report configurations associated with the active cells based at least in part on the number of active cells satisfying the threshold and the downlink control information triggering channel state information reference signal measurements for the dormant secondary cell.

12. The apparatus of claim 10, wherein instructions for the at least one processor to cause the UE to perform the channel state information reference signal measurements according to the cell measurement supported by the UE comprise instructions for the at least one processor to cause the UE to:

determine that the number of cells in the cell group satisfies the threshold; and perform the channel state information reference signal measurements for the active cells in the set of cells identified in the one or more other channel state information report configurations associated with the active cells based at least in part on the number of cells satisfying the threshold and the downlink control information triggering channel state information reference signal measurements for the dormant secondary cell.

13. The apparatus of claim 9, wherein instructions for the at least one processor to cause the UE to perform the channel state information reference signal measurements according to the cell measurement supported by the UE comprise instructions for the at least one processor to cause the UE to:

identify at least one channel state information report configuration identified in the downlink control information that is associated with active secondary cells in the cell group; and perform the channel state information reference signal measurements for the active cells associated with the at least one channel state information report configuration associated with the active cells based at least in part on the at least one channel state information report configuration being associated with the active secondary cells and the downlink control information triggering channel state information measurements for the dormant secondary cell.

14. The apparatus of claim 9, wherein the downlink control information comprises a downlink grant triggering the channel state information reference signal measurements or an uplink grant triggering the channel state information reference signal measurements.

15. An apparatus for wireless communication at a primary cell, comprising:

at least one processor, and memory coupled with the at least one processor, the memory storing instructions for the at least one processor to cause the apparatus to:

identify a cell group configured for a user equipment (UE);

transmit a downlink control information to the UE triggering channel state information reference signal measurements for a set of cells in the cell group, the set of cells comprising a dormant secondary cell; and receive a channel state information report from the UE that indicates the channel state information for active cells in the set of cells, wherein channel state information for the dormant secondary cell is omitted from the channel state information report based at least in part on a number of cells in the cell group satisfying a threshold.

16. The apparatus of claim 15, wherein the instructions for the at least one processor to receive the channel state information report are further for the at least one processor to cause the apparatus to:

receive the channel state information report that indicates the channel state information for the active cells in the set of cells that are associated with a channel state information report configuration.

* * * * *